United States Patent [19]

Hong et al.

[11] E Re. 30,187

[45] Reissued Jan. 8, 1980

[54] PLURAL CHANNEL ERROR CORRECTING APPARATUS AND METHODS

[75] Inventors: Se J. Hong, Poughkeepsie, N.Y.; Arvind M. Patel, San Jose, Calif.

[73] Assignee: International Business Machines Corporation, Armonk, N.Y.

[21] Appl. No.: 771,042

[22] Filed: Feb. 22, 1977

Related U.S. Patent Documents

Reissue of:

[64] Patent No.: 3,868,632
Issued: Feb. 25, 1975
Appl. No.: 390,136
Filed: Aug. 20, 1973

U.S. Applications:

[63] Continuation-in-part of Ser. No. 306,975, Nov. 15, 1972, abandoned.

[51] Int. Cl.[2] ..... G06F 11/12
[52] U.S. Cl. ..... 340/146.1 AL
[58] Field of Search ..... 340/146.1 AL; 364/200, 364/900

[56] References Cited

U.S. PATENT DOCUMENTS

| | | | |
|---|---|---|---|
| 3,519,988 | 7/1970 | Grossman | 340/146.1 F |
| 3,629,824 | 12/1971 | Bossen | 340/146.1 AL |
| 3,675,200 | 7/1972 | Bossen et al. | 340/146.1 AL |
| 3,697,948 | 10/1972 | Bossen | 340/146.1 AQ |
| 3,728,678 | 4/1973 | Tong | 340/146.1 AQ |
| 3,745,526 | 7/1973 | Hong et al. | 340/146.1 AL |
| 3,745,528 | 7/1973 | Patel | 340/146.1 AL |
| 3,800,281 | 3/1974 | Devore et al. | 340/146.1 AL |
| 3,851,306 | 11/1974 | Patel | 340/146.1 AL |
| 3,868,632 | 2/1975 | Hong et al. | 340/146.1 AL |
| 3,982,226 | 9/1976 | Bunker et al. | 340/146.1 AL |

OTHER PUBLICATIONS

Sellers et al., Error Detecting Logic for Digital Computers, McGraw-Hill Co., pp. 253–254.

*Primary Examiner*—Charles E. Atkinson
*Attorney, Agent, or Firm*—Herbert F. Somermeyer

[57] ABSTRACT

Error correcting apparatus is provided for correcting plural channels in error in a parallel channel information system. The information is encoded in a cross-channel direction as well as along the channel length. The encoded message after storage or transmission is decoded in the cross-channel direction and error correction provided in the in-channel direction in a given number of indicated channels. Orthogonally symmetrical redundancy enhances error correction while tending to minimize hardware. Plural independent codes interact to correct the plural channels in error. The error correcting capabilities of the codes may be matched, no limitation thereto intended.

58 Claims, 23 Drawing Figures

HORIZONTAL VECTORS

VERTICAL VECTORS

SIGNAL SET TOPOLOGY $g(X) = 1 + X^3 + X^4 + X^5 + X^8$ $$T^7 = \begin{bmatrix} 0 & 1 & 0 & 0 & 1 & 1 & 1 & 1 \\ 0 & 0 & 1 & 0 & 0 & 1 & 1 & 1 \\ 0 & 0 & 0 & 1 & 0 & 0 & 1 & 1 \\ 0 & 1 & 0 & 0 & 0 & 1 & 1 & 0 \\ 0 & 1 & 1 & 0 & 1 & 1 & 0 & 0 \\ 0 & 1 & 1 & 1 & 1 & 0 & 0 & 1 \\ 0 & 0 & 1 & 1 & 1 & 1 & 0 & 0 \\ 1 & 0 & 0 & 1 & 1 & 1 & 1 & 0 \end{bmatrix}$$

$M_3$ $$M_3 = \begin{bmatrix} 1 & 1 & 0 & 0 & 1 & 0 & 0 & 1 \\ 0 & 1 & 1 & 0 & 0 & 1 & 0 & 0 \\ 1 & 0 & 1 & 1 & 0 & 0 & 1 & 0 \\ 1 & 0 & 0 & 1 & 0 & 0 & 0 & 0 \\ 0 & 0 & 0 & 0 & 0 & 0 & 0 & 1 \\ 0 & 1 & 0 & 0 & 1 & 0 & 0 & 1 \\ 0 & 0 & 1 & 0 & 0 & 1 & 0 & 0 \\ 1 & 0 & 0 & 1 & 0 & 0 & 1 & 0 \end{bmatrix}$$

CODE POINTER GENERATOR 72

PLURAL CHANNEL ERROR CORRECTING APPARATUS AND METHODS

Matter enclosed in heavy brackets [ ] appears in the original patent but forms no part of this reissue specification; matter printed in italics indicates the additions made by reissue.

REFERENCE TO OTHER [PATENTS] *PATENT DOCUMENTS*

This is a continuation-in-part of Ser. No. 306,975, filed Nov. 15, 1972, now abandoned.

Hinz, Jr. U.S. Pat. No. 3,639,900 shows using pointers for error correction purposes and a readback system which may employ the present invention.

*DOCUMENTS INCORPORATED BY REFERENCE*

*U.S. Pat. No. 3,508,194 shows construction of a modulo two adder usable in the present invention.*

BACKGROUND OF THE INVENTION

This invention relates to an error correction system for a multichannel parallel information handling system and, more particularly, to plural channel error correction using signal quality pointers and correcting signals from fewer than such plurality of channels without such quality pointers.

In data handling systems, information is encoded for error detection and correction purposes by adding redundant bits to the data message in such a way that the total message can be decoded with an economical apparatus to faithfully supply the original information even when plural first errors occur in such message. Parallel data arrangements, that is, arrangements where the information is contained in parallel bytes arranged within a block of data, are used in computers and are well known, especially in multichannel recording apparatus. U.S. Pat. No. 3,629,824, filed Feb. 12, 1970, discloses encoding and decoding apparatus in which the redundant or check bits are associated with the data in a cross-byte or cross-track direction. This patent sets forth a code capable of correcting one or more errors within one byte of data having a given number of bits. The data is divided into a plurality of fixed-sized signal sets each consisting of k bytes of data (each byte having b bits), plus two check bytes, each of b bits. The decoder recovers the data without error when not more than a single byte of the received message is in error no matter how many bits may be in error in the single byte. Co-pending U.S. application, Ser. No. 99,490, filed Dec. 18, 1970, and now U.S. Pat. No. 3,697,948, utilizes the above-identified code, but extends the capabilities thereof by combining therewith pointer signals which extend the error correcting capability of the arrangement to two bytes in error regardless of the number of bits in error in each byte. These systems require two channels for the two additional check bytes needed for error correction, respectively. As the density of the information along the tracks or channels has increased, a faster, more reliable, simpler, but powerful, error correcting scheme is required which utilizes only one additional track for check bits.

In one-half inch magnetic tape systems, it is highly desirable that tape be readable in both directions of transport. Usually, the tape is recorded only when transported in a first direction, arbitrarily defined as forward. A tape recorder should read in the forward and backward directions. When this fact is coupled with error detection and correction requirements, it is apparent that error codes should be operable for both directions of data transfer. Since the bit sequences are unalike in such transfers, many error detection and correction schemes require the data be accumulated before performing the error functions. For controlling costs and enhancing data throughput, it is desirable to perform error encoding and syndrome generation during readback on a serial basis—that is, perform calculations concurrently with data transfer rather than wait for all data transfers to be completed.

SUMMARY OF THE INVENTION

Accordingly, it is a main object of the present invention to provide error correcting systems and methods in which information signals are encoded in the cross-track (vertical) direction as well as the track-length (horizontal) direction and decoded so that the error correction is selectively applied along a selected track or channel.

It is another object of the present invention to provide plural channel error correction which requires only one channel for check bits in a parallel multichannel information system.

It is a further object of the present invention to provide error correction which utilizes a minimum redundancy to obtain correction of signals from plural tracks in error with signal quality pointers and at least one such track in error without such signal quality pointers.

It is a main feature to provide orthogonally symmetrical error detection and correction. Another feature is to employ plural independent error codes with interaction means simultaneously using both code redundancies to effect one error correction action with a capability equal to the sum of the error correction code individual capabilities.

Briefly, the invention contemplates error correcting apparatus for simultaneously correcting plural channels in error in a parallel channel information system wherein the information signals are encoded for error correction purposes in a cross channel (byte or vertical) direction as well as in the channel or horizontal direction. The encoded information signals are decoded so as to provide error correction in the channel direction in any single channel in error or in a number of channels in error which are indicated as being in error. Error correction apparatus is constructed in accordance with a matrix for both vertical and horizontal directions having a selected orthogonal symmetry. This symmetry is chosen to enable check bit generation along one dimension and correction along an orthogonal dimension.

The foregoing and other objects, features, and advantages of the invention will be apparent from the following more particular description of the preferred embodiment of the invention, as illustrated in the accompanying drawing.

GENERAL THEORY

In operation, information in the system is fed in parallel form to an error correction residue encoder wherein check and parity bits are sequentially generated for information signal sets referred to as bytes. These parity and check bit signals are supplied with the information signals such that the information signals can be error corrected. The present invention, via its orthogonal symmetry, enables calculation of check bits and syndromes using signals grouped in a so-called vertical direction and employs signals derived from such calculated signals to correct signals aligned in an orthogonal or so-called horizontal dimension. The invention also permits so-called backward error correction capability.

Figure 1:
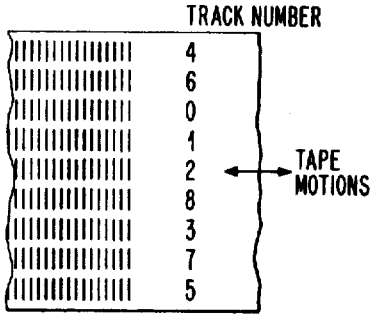
FIG. 1 is a schematic representation showing eight data channels or tracks and a parity track, such as found on one-half inch tape.

The standard way of recording binary data on one-half inch tapes is a 9-track format diagrammatically shown in FIG. 1. One of the tracks P or track 8 is reserved to record "parity" over the other eight tracks, one parity bit for one byte recorded with one bit in each of the eight tracks. Such parity bit is known as the vertical redundancy check (VRC) bit as set forth in U.S. Pats. Nos. 3,508,194, 3,508,195, and 3,508,196. Each byte consisting of eight information bits and the parity bit is simultaneously recorded with one bit in each of the nine tracks and is read back and reassembled as bytes in accordance with Floros U.S. Pat. No. Re. 25,527. This data format has evolved over many years of wide use of magnetic record tapes. To correct one track in error, the so-called CRC system referred to above points to the track in error to enable error correction based on parity. This system only allowed correction of one track in one block of recorded signals. The present invention enables correction of all tracks provided no more than two tracks are in error at a given instant. Modifications of the invention may alter the number of correctable tracks in error.

In designing new products, compatibility with the existing recorded tapes is one of the prime considerations in order that the tapes recorded on different machines can be freely interchanged. Bit density in the direction of motion of the tape in much greater than track density. Because of self-clocking aspects in reproducing recorded signals, one error-causing phenomenon results in the following signals in the same track to be in error, referred to as a burst of errors. Such errors are mainly caused by defects in the magnetic media and separation of tape from transducer resulting in a loss of synchronization or skew information in the readback circuits. The erroneous tracks are often indicated by loss of signals in the read amplifiers or change in phase between a clocking signal and the readback signal. This invention enables correction of these types of errors simultaneously occurring in plural channels.

Figure 2:
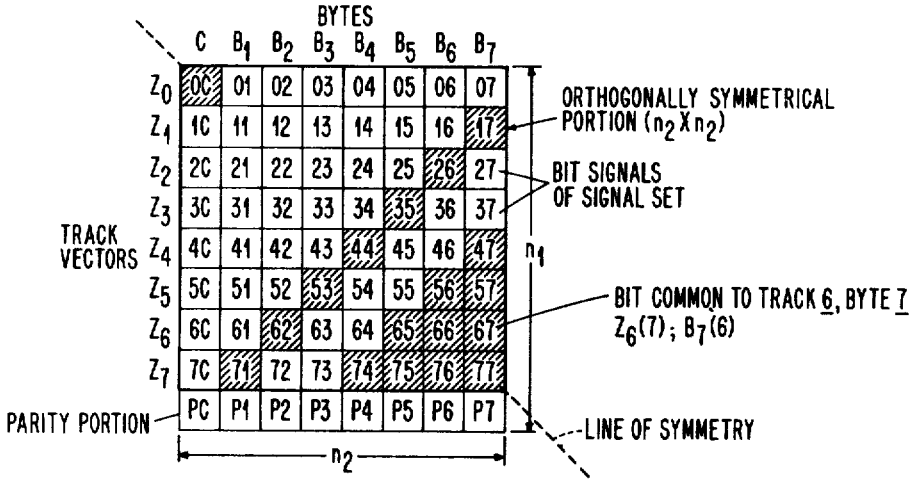
FIG. 2 is a schematic topological representation of the data format on the tracks in the system showing the check bits along the vertical or cross-track direction and the vertical parity bits on the separate independent track or channel.

In the invention, the error correcting signal set topology for recorded or transmitted code words is in the geometric or time form of a block or rectangle conceptually with two orthogonal sides having check and parity bits, as shown in FIG. 2. The byte vectors are enumerated from C, the check byte, through $B_7$, the first data byte. The track vectors are enumerated $Z_0$ through P. Those bits represented by the small rectangles, lying within the heavy line box, form an orthogonally symmetrical signal set portion; while track vector P lies outside such portion, but is used therewith to enable multiple track corrections with optimal redundancy. The orthogonally symmetrical portion enables interrelationship of check byte C with any data bit 01 . . . 77 by calculations performed on a byte serial basis ($B_1 \ldots B_7$ or $B_7 \ldots B_1$), on a track serial basis ($Z_0 \ldots Z_7$ or $Z_7 \ldots Z_0$), or simultaneously; i.e., in the latter, all data bits are buffered and an array calculator ascertains byte C. In applying the principle of orthogonal symmetry to error correction apparatus and method in a preferred mode, the orthogonal symmetrical redundancy or check byte C is generated in a byte serial calculation, the error syndromes on a byte serial basis, and the error pattern on a track basis. The error pattern calculation may include consideration of the parity check portion P.

The track correction is obtained by correcting the clusters of errors along the tracks in error. It is well known that the error correcting codes for symbols from $GF(2^b)$—b is a positive integer and GF means Galois Field—the Galois Field of $2^b$ elements, can be used for corrections of clusters of b-adjacent binary symbols. In the b-adjacent codes, each check symbol in $GF(2^b)$ is replaced by b binary check digits; and each information symbol in $GF(2^b)$, likewise, is replaced by b binary information digits. In such known systems, the encoding and decoding operations are performed on these bit clusters of b binary digits; thus obtaining b-adjacent correction corresponding to the correction of a symbol in $GF(2^b)$. Applying such error detecting and correcting systems to multitrack digital recorders requires the selection of bit clusters along the respective tracks. This arrangement is selected because of the above-mentioned error mode in such recorders. As a result, all data signals in one group of signals being error detected and corrected must be accumulated and stored before any error control activity is initiated.

Because of orthogonal symmetry, this invention avoids this restriction of symbols in $GF(2^b)$ being in such track-oriented clusters of b binary digits of information or check bits. Accordingly, the code words are not describable in terms of the symbols in $GF(2^b)$. An advantage of avoiding symbols from $GF(2^b)$ is that binary check bits are no longer required to be track clustered for representation of the check symbols in $GF(2^b)$. Instead, each binary check bit is independently placed in the message. This property is advantageously used in the present invention to mix the binary check digits and the information digits in correctable orthogonally symmetrical clusters. Mixing the information and check bits as described also allows enhanced error correction in a tape system which is compatible with above-mentioned existing tape systems. More specifically, in a preferred form of the invention, double-track correction is provided wherein only one separate track is reserved solely for check bits rather than two tracks, as required in the known prior art using the Galois Field approach. A single track correction may be provided when the parity track is dispensed with; and a single track pointer locates the track in error, i.e., there are but eight tracks used rather than nine. The disclosed apparatus is directly usable for such an operation by continuously activating the later-described $j=8$ signal from FIG. 14c and always making the parity vector $P=0$. This action makes the parity track 8 appear to always be in error; hence, with one of the data tracks 0–7 being in error, the apparatus corrects that single track in the same manner that track i is corrected for the later-described correction of two tracks in error, one of which is the parity track 8.

It will be appreciated by those skilled in the art that this invention can be applied to diverse information signal handling systems of varying capacities. The invention will, therefore, be described in terms of the known 9-track magnetic tape recording system, such as taught by Hinz, Jr., supra.

The present invention employs orthogonal symmetry in check bit residue generation and utilization for enabling generation of such check bits by sequentially analyzing each byte of data, one bit to a channel, and then correcting several bits along each channel using the byte-generated residue. To accomplish this end, the underlying parity check matrices for the byte-oriented or vertical residue generation establish an identical data-bit-to-check-bit relationship as that established when the check bits are calculated either in the horizontal or track direction. The identicalness required in such data-bit-to-check-bit relationship is described later with joint reference to FIGS. 4 and 6. Such identicalness requires an orthogonally symmetrical operation, both in error check bit generation and utilization apparatus.

The term orthogonal symmetry pertains to the information and check bits independent of the vertical parity bits. As will become apparent, such orthogonal symmetry enables the check bits generated based upon the byte information signals $B_1 \ldots B_7$ to correct along the track vectors $Z_0 \ldots Z_7$ (independent of parity for one track and with parity for two tracks; i.e., one of the tracks in error is parity track 8 indicated by the later-described $j=8$ signal). This feature arises from relating the generated check bits to the information bits by using the following two equations as a basis for generating and using the check bits, respectively. For correct information and check bits:

$$T^0C+T^1B_1+T_2B_2+T^3B_3+T^4B_4+T^5B_5+T^6B_6+\cdots T^7B_7[+0]=0 \quad \text{(A)}$$

$$T^0Z_0+T^1Z_1+T^2Z_2+T^3Z_3+T^4Z_4+T^5Z_5+T^6Z_6\cdots+T^7Z_7[+0]=0 \quad \text{(B)}$$

In the above two equations, B's are the information bytes across tracks 0–7; C is the check bit byte across tracks 0–7; Z's are the signals along tracks 0–7, respectively, within a given signal set, viz, in track 0, bit 0, of $B_1 \ldots B_7$, C, etc.; and the T's are matrix multipliers selected to accomplish such orthogonal symmetry and as set forth later.

The above two equations show that the serial matrix multiplication and modulo 2's summation of the terms equal the modulo 2 sums of matrix multiplication using the same matrices but multiplying with the information signals and single check bit signal value along the indicated tracks. With this equality, check byte C is generated based upon the bytes $B_0 \ldots B_7$; while error correction is achievable along the tracks $Z_0 \ldots Z_7$.

In a best mode, the number of bytes $B_0 \ldots B_7$, plus C, equals the number of bits along each track $Z_0 \ldots Z_7$ contained in such bytes. This yields a square array—in 9-track tape, an $8 \times 8$ bit array exhibiting the above-defined orthogonal symmetry (see FIG. 2). The following discussion is directed at a particular application of the invention using parity bits in the ninth track P, no limitation thereto intended. Instead of parity, a cyclically generated parity bit field may be used. For error correction, the parity and check bit fields are interrelated in a novel manner as later described.

In a preferred and best mode form, the code words of the code of the present invention, mathematically, have rectangular or block format of vertical dimension $n_1$ and horizontal dimension $n_2$, where $n_1$ is greater than $n_2$ as seen in FIG. 2. $n_1$ and $n_2$ are expressed in information bits, not geometric distances. Dimension $n_1$ is across the plurality of channels. Therefore, according to the invention, a group of data-representing signals in a multichannel signal transfer system has a length in number of data bits along each and every channel less than the number of channels and greater than one. Usually, a number of data-representing signals greater than the number of channels is transferred in a given signal transfer operation. Accordingly, each such signal transfer consists of a plurality of such lengths of data bits and associated check bits are hereinafter described.

Remembering the orthogonal symmetry concept and that an additional channel is used for an ancillary parity check field, such $n_1$ and $n_2$ dimensions readily adapt as a format in multichannel record tapes. To obtain the optimal orthogonal symmetry in channels $Z_0 \ldots Z_7$, with but one additional parity track, $n_1$ is one greater than $n_2$. If it is desired to provide additional error locating power, additional parity channels may be added, for example, using a Hamming code, to increase the correction power of the present invention. However, for optimum utilization of redundancy, $n_1$ is one greater than $n_2$. Also, the inventive orthogonal symmetry for error correction codes may be applied without additional parity or other coding, but obtaining a lesser correcting power, unless additional orthogonally symmetrical redundancy is added.

The check bits are orthogonally located in the message block rectangle (nothing to do with the orthogonal symmetry referred to above). In 9-track tape, the parity track is along the center of the tape; hence, the vertical check bits are central of dimension $n_1$, splitting the $n_1$ extending check bits into two portions on the tape, as at P. From an error detection and correction view, within the concepts of the broader aspects of the independent placement of check bits, the arrangements are identical. The check bits along the shorter horizontal dimension $n_2$ are parity check bits over the coordinate lines along the $n_1$ dimension, corresponding to present-day parity track. In existing tape systems, the vertical redundancy check (VRC) or vertical parity bits are on a separate tape track called the parity track P (track 8). The remaining check bits along dimension $n_1$ are based upon information bits in selected positions along the tracks or channels, as later set forth. For two-track correction, the redundancy or number of check bits is minimized when $n_2$ is the largest for a given $n_1$, i.e., $n_2=n_1-1$. This arrangement is the most square data field, hence, based on geometry, the fewest number of check bits per data bit. One system for the special case of $n_1=9$ for the standard 9-track one-half inch tape application will be discussed. Other arrangements may be employed, as will be set forth. The code for other values of n can be constructed in a similar manner.

Figure 3:
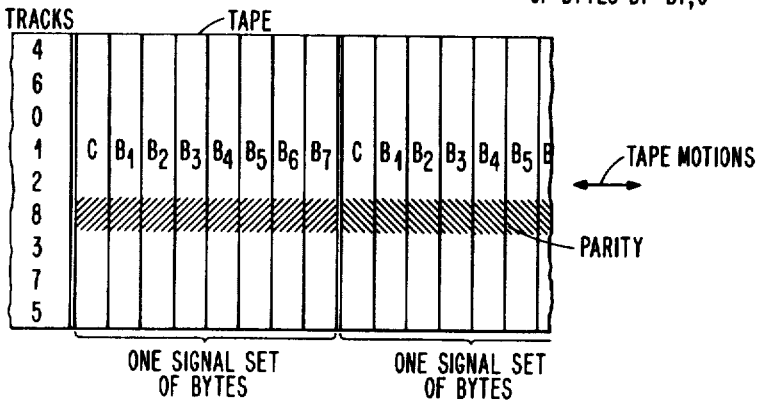
FIG. 3 is a schematic representation of the layout of the bytes of data in the cross-track direction for a 9-track tape system.

The data format for a preferred form of the code of the present invention, herein identified as an optimal rectangular code (ORC), for 9-track tapes is diagrammatically shown in FIG. 3. Each independent error correcting signal set has seven bytes of information respectively and arbitrarily denoted by $B_1$, $B_2$, $B_3$, $B_4$, $B_5$, $B_6$, and $B_7$. The reverse order of bytes may be used, and the check byte C may be placed anywhere in the signal set, as will be elaborated upon later. C denotes an orthogonally symmetrical cross-track check byte computed from serially presented information bytes $B_1 \ldots B_7$. As used in the underlying mathematics, each of the information bytes, individually denoted by $B_i(i=1\text{-}7)$ and the check byte C, are 8-digit column vectors (vertical multibit elements in matrix arithmetic):

$$B_i = \begin{bmatrix} B_i(0) \\ B_i(1) \\ \cdot \\ \cdot \\ \cdot \\ B_i(7) \end{bmatrix}$$

and $$C = \begin{bmatrix} C(0) \\ C(1) \\ \cdot \\ \cdot \\ \cdot \\ C(7) \end{bmatrix}$$

wherein $B_i(0)$ is bit 0 of byte $B_i$ and C(0) is bit 0 of byte C, etc. The vector P is the conventional VRC (vertical redundance check) represented similarly by an 8-digit column vector in which bit component P(0) is the even parity bit of the byte C and the component even P(i) is the parity bit of byte $B_i$; $i=1, 2 \ldots 7$.

$$P(0)=C(0)\oplus C(1)\ldots\oplus C(7) \tag{1-E}$$

and $$P(i)=B_i(0)\oplus B_i(1)\ldots\oplus B_i(7) \tag{2-E}$$

For odd parity:

$$P(0)=C(0)\oplus C(1)\oplus\ldots\oplus C(7) \tag{1-0}$$

and $$P(i)=B_i(0)\oplus B_i(1)\oplus\ldots\oplus B_i(7) \tag{2-E}$$

For odd parity:

$$\overline{P(0)}=C(0)\oplus C(1)\oplus\ldots\oplus C(7) \tag{1-0}$$

and $$\overline{P(i)}=B_i(0)\oplus B_i(1)\oplus\ldots\oplus B_i(7) \tag{2-0}$$

for $$i=1,2\ldots 7$$

where $\oplus$ denotes modulo 2 sum; P(0), P(i) is the modulo 2 sum; and $\overline{P(0)}$ and $\overline{P(i)}$ is the complement of the modulo 2 sum.

The check byte C is computed from the information bytes $B_1, B_2, \ldots B_7$ using the following matrix equation:

$$C=TB_1\oplus T^2B_2\oplus T^3B_3\oplus\ldots\oplus T^7B_7 \tag{3a}$$

where T is the companion matrix of an irreducible binary polynominal g(x) of degree 8 and $T^i$ represents the $i^{th}$ power of the matrix T. Let g(x) be given by:

$$g(x)=g_0+g_1x+g_2x^2+\ldots g_7x^7+g_8x^8 \tag{3b}$$

where:

$$g_0=g_8=1$$

and $g_i$ is either zero or one for $i=1, 2, \ldots 7$.

The generalized companion matrix T of the polynomial g(x) degree 8 is defined as:

$$T = \begin{bmatrix} 0000000g_0 \\ 1000000g_1 \\ 0100000g_2 \\ 0010000g_3 \\ 0001000g_4 \\ 0000100g_5 \\ 0000010g_6 \\ 0000001g_7 \end{bmatrix} \tag{4a}$$

The check byte C can be generated by means of a feedback shift register, Exclusive-OR circuit array, programmed machine (preferably microcoded), and the like. A shift register implementation is described as the most economical for a given data rate. For lower data rates, a programmed machine is more economical, while for higher data rates, Exclusive-OR circuit arrays may be required. The above equations define the rules for encoding the message. These rules can be specified by the conventional means of a parity check matrix H. For this purpose, we characterize the matrices $T^i$ in terms of the elememts of the Galois Field $GF(2^8)$.

Figure 4:
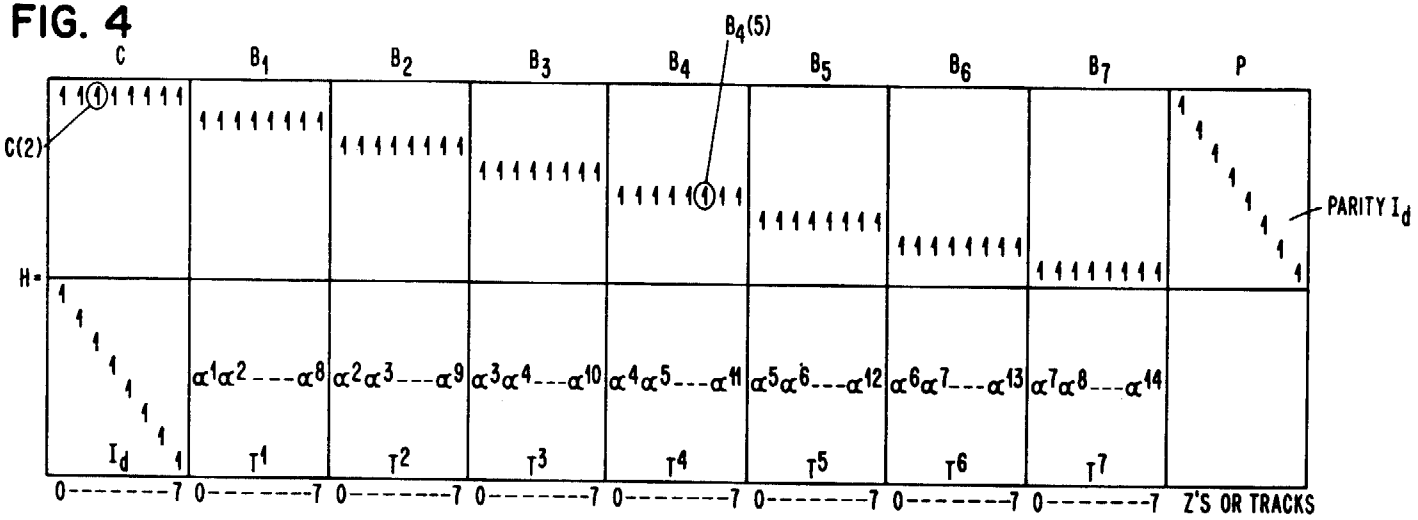
FIG. 4 shows the parity check matrix H for encoding of the data in the cross-track direction.
Figure 6:
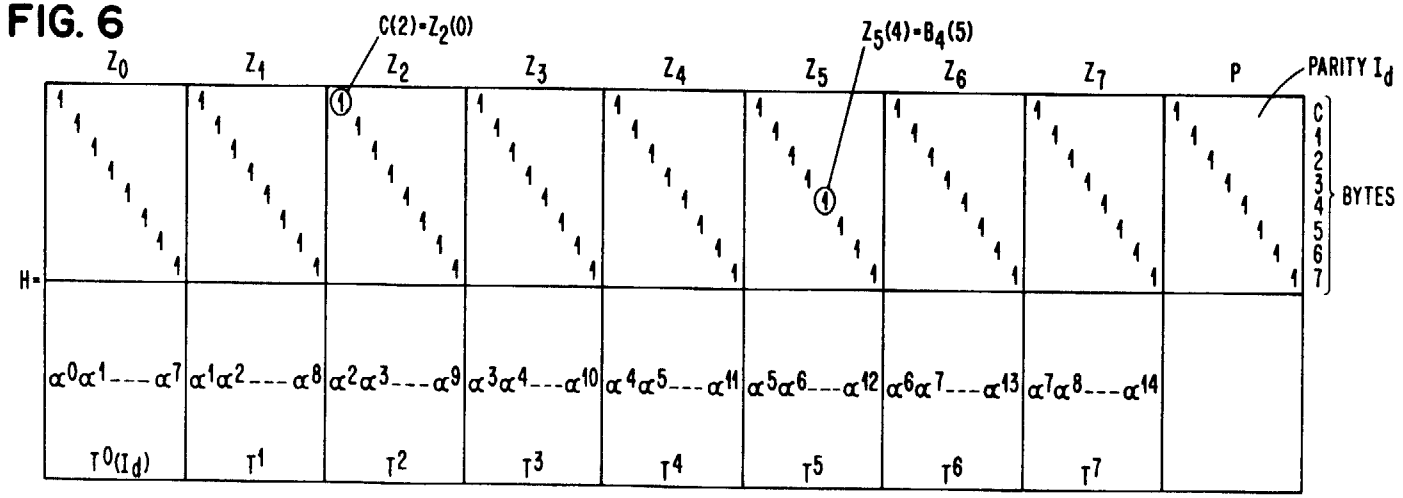
FIG. 6 shows the parity check matrix H for decoding and error correction in the track-length direction.

Let $\alpha$ be the element of the $GF(2^8)$ representing the residue class (x) modulo g(x)—an $\alpha$ occurs for each column of matrix T in (4a). Referring to (3a), g(x) is made equal to zero. To obtain reside classes, modulo g(x), the most significant term $g_8x^8$ is made equal to the sum of the other terms. In any calculation, when term $g_8x^8$ appears, the other terms are substituted for such most significant term. In practice, such action is accomplished in a linear feedback shift register and the like. Multiplication in $GF(2^8)$ is defined by the polynomial multiplication of the residue classes modulo g(x). Hence, the element $\alpha^i$ for any i represents the residue class ($x^i$) modulo g(x). Therefore, any element $\alpha^i$ can be expressed as an 8-digit column vector of the binary coefficients of the polynomial $x^i$ modulo g(x). For example, for $g(x)=1+x^3+x^4+x^5+x^8$, the $\alpha^i$'s are respectively represented by the column vectors as described below and relate to the matrices T as shown in FIGS. 4 and 6.

Matrices for an error correction apparatus consist of $\alpha$ column vectors; $T^0=\alpha^0 \ldots \alpha^7$; $T^1=\alpha^1 \ldots \alpha^8$, etc. (FIGS. 4 and 6). Hence, a set of $\alpha$ column vectors is selected to constitute the matrices $T^0 \ldots T^n$ for establishing error code generating and error detecting and correcting apparatus. For orthogonal symmetry, the $\alpha$ column vectors are established as later described with respect to FIGS. 4 and 6. In one preferred apparatus, there are 15 unique $\alpha$ column vectors corresponding to an 8-bit redundancy or check byte. In this particular apparatus, the column vectors $\alpha^0 \ldots \alpha^7$ have but one term equal to 1, i.e., $\alpha^1$ has a 1 in the $i^{th}$ position, corresponding to the check bit position as follows:

$$\alpha^0=\begin{bmatrix}1\\0\\0\\0\\0\\0\\0\\0\end{bmatrix}\quad \alpha^1=\begin{bmatrix}0\\1\\0\\0\\0\\0\\0\\0\end{bmatrix}\quad \alpha^2=\begin{bmatrix}0\\0\\1\\0\\0\\0\\0\\0\end{bmatrix}\quad \alpha^3=\begin{bmatrix}0\\0\\0\\1\\0\\0\\0\\0\end{bmatrix}$$

$$\alpha^4=\begin{bmatrix}0\\0\\0\\0\\1\\0\\0\\0\end{bmatrix}\quad \alpha^5=\begin{bmatrix}0\\0\\0\\0\\0\\1\\0\\0\end{bmatrix}\quad \alpha^6=\begin{bmatrix}0\\0\\0\\0\\0\\0\\1\\0\end{bmatrix}\quad \alpha^7=\begin{bmatrix}0\\0\\0\\0\\0\\0\\0\\1\end{bmatrix}$$

where the 0, 1 columns represent a column vector. Each bit has its own equation; otherwise, simultaneous equations rather than separate equations.

For one code exhibiting orthogonal symmetry, as later explained, one set of $\alpha^8 \ldots \alpha^{17}$ is:

$$\alpha^8=\begin{bmatrix}1\\0\\0\\1\\1\\1\\0\\0\end{bmatrix}\quad \alpha^9=\begin{bmatrix}0\\1\\0\\0\\1\\1\\1\\0\end{bmatrix}\quad \alpha^{10}=\begin{bmatrix}0\\0\\1\\0\\0\\1\\1\\1\end{bmatrix}\quad \alpha^{11}=\begin{bmatrix}1\\0\\0\\0\\1\\1\\1\\1\end{bmatrix}$$

-continued $$\alpha^{12}=\begin{bmatrix}1\\1\\0\\1\\1\\0\\1\\1\end{bmatrix}\quad \alpha^{13}=\begin{bmatrix}1\\1\\1\\1\\0\\0\\0\\1\end{bmatrix}\quad \alpha^{14}=\begin{bmatrix}1\\1\\1\\0\\0\\1\\0\\0\end{bmatrix}\quad \alpha^{15}=\begin{bmatrix}0\\1\\1\\1\\0\\0\\1\\0\end{bmatrix}$$

$$\alpha^{16}=\begin{bmatrix}0\\0\\1\\1\\1\\0\\0\\1\end{bmatrix}\quad \alpha^{17}=\begin{bmatrix}1\\0\\0\\0\\0\\0\\0\\0\end{bmatrix}=\alpha^0$$

The selected $\alpha$ column vectors constituting the matrices T are:

$T^0=\alpha^0 \ldots \alpha^7$ $T^1=\alpha^1 \ldots \alpha^8$ $T^2=\alpha^2 \ldots \alpha^9$ $T^3=\alpha^3 \ldots \alpha^{10}$ $T^4=\alpha^4 \ldots \alpha^{11}$ $T^5=\alpha^5 \ldots \alpha^{12}$ $T^6=\alpha^6 \ldots \alpha^{13}$ $T^7=\alpha^7 \ldots \alpha^{14}$ hence, yielding eight unique matrices as shown in FIGS. 4 and 6. The column vectors $\alpha^{15}$ and $\alpha^{16}$ are not used.

The above-selected column vectors $\alpha^0 \ldots \alpha^{14}$ place check byte C as byte 0 in the error correcting signal set, see FIG. 3; and the relationship between the data bytes $B_1 \ldots B_7$, C and $\alpha$ column vectors as shown in FIGS. 4 and 6. Any $T^i$ can replace $T^0$ in the first byte position, each selection altering the mathematical placement of check byte C with respect to the data bytes and also altering the participation of a given data bit in the check byte redundancy. The illustrated check byte C placement is effected by selecting the first or leftmost $\alpha$ column vector of $T^n=T^0$, where n is the cycle length of g(x). To place check byte C in second position (byte $B_1$ position), such first $\alpha$ column vector in $T^{n-1}$ is $\alpha^{n-1}$ yielding the following T matrices:

$T^{n-1}=T^{14}=[\alpha^{14},\alpha^0, \alpha^1 \ldots \alpha^6]$ $T^n=T^0=[\alpha^0 \ldots \alpha^7]$ $T^1=[\alpha^1 \ldots \alpha^8]$ $T^2=[\alpha^2 \ldots \alpha^9]$ $T^3=[\alpha^3 \ldots \alpha^{10}]$ $T^4=[\alpha^4 \ldots \alpha^{11}]$ $T^5=[\alpha^5 \ldots \alpha^{12}]$ $T^6=[\alpha^6 \ldots \alpha^{13}]$ where $\alpha^{15}=\alpha^0$.

In general, to put check byte C (first) in byte position "k"(k=0–7), the matrix $T^{n-k}$ is selected as the first matrix while maintaining orthogonal symmetry. In a sequence of error correcting signal sets, the byte C placement may process.

The above $\alpha$-column-vector-to-matrix-T relationships yield a separate and independent EXCLUSIVE-OR equation for each of the eight check bits in check byte C. Such selection reduces hardware complexity, hence, is desirable from a cost view. Such separate and independent equations are not necessary. Check byte C can be associated with the data bits by other than the identity matrix $I_d$; this selection may result in interaction between the check bits yielding simultaneous interdependent equations rather than independent equations for each check bit. That is, a given check bit equation may include a second check bit along with a set of data bits in its EXCLUSIVE-OR equation.

An example of such an arrangement using $\alpha^2 \ldots \alpha^{16}$ set forth above is:

| Matrix | | $\alpha$'s | Byte |
|---|---|---|---|
| $T^2$ | = | $\alpha^1 \ldots \alpha^9$ | C |
| $T^3$ | = | $\alpha^3 \ldots \alpha^{10}$ | 1 |
| $T^4$ | = | $\alpha^4 \ldots \alpha^{11}$ | 2 |
| $T^5$ | = | $\alpha^5 \ldots \alpha^{12}$ | 3 |
| $T^6$ | = | $\alpha^6 \ldots \alpha^{13}$ | 4 |
| $T^7$ | = | $\alpha^7 \ldots \alpha^{14}$ | 5 |
| $T^8$ | = | $\alpha^8 \ldots \alpha^{15}$ | 6 |
| $T^9$ | = | $\alpha^9 \ldots \alpha^{16}$ | 7 |

Since $\alpha^8$ and $\alpha^9$ column vectors have more than a single "1", interaction among the check bits results. The mathematical placement of check byte C can be altered as previously alluded to. Orthogonal symmetry is maintainable. For all of the above matrices, the column vectors or field elements $\alpha^i$ are a cyclic subgroup with cycle length n where $8 \leqq n < 2^8$ and n is the exponent of g(x) (n = 15 in the illustrated preferred apparatus). Using the above notation, the companion matrix T for any matrix as set forth in (4) can be written as:

$$T = [\alpha^1 \alpha^2 \alpha^3 \ldots \alpha^8] \tag{5}$$

In (4a), $\alpha$ is the leftmost column vector, $\alpha^2$ the one to the immediate right, etc., and $\alpha^8$ is the rightmost column vector. Any 8-digit column vector:

$$\beta = \begin{bmatrix} \beta(0) \\ \beta(1) \\ \cdot \\ \cdot \\ \cdot \\ \cdot \\ \beta(7) \end{bmatrix} \cdot$$

wherein (0) . . . (7) correspond to bits from $g_0 \ldots g_7$, respectively. This column vector represents the residue class $\{\beta(0)+\beta(1)x+ \ldots +\beta(7)x^7\}$ modulo g(x) and hence is an element of $GF(2^8)$. It can be shown that the matrix multiplication $T\beta$ corresponds to the multiplication of the field elements $\alpha$ and $\beta$. In particular:

$$T\,\alpha^i = \alpha^{i+1} \tag{6a}$$

Using equations (5) and (6a), we can write:

$$T^2 = T[\alpha^1 \alpha^2 \ldots \alpha^8] \tag{6b}$$

$$= [T\alpha^1 T\alpha^2 \ldots T\alpha^8] = [\alpha^2 \alpha^3 \ldots \alpha^9] \tag{6c}$$

and in general for any positive integer i:

$$T^i = [\alpha^i \alpha^{i+1} \ldots \alpha^{i+7}] \tag{7}$$

If cycle length n of a cyclic subgroup is the exponent of the polynomial g(x), then $T^n$ is the identity matrix $I_d$, also written as $T^0$. "d" is the degree of such identity matrix. One property of such an exponent n is that it is the least positive number for which:

$$T^n = T^0 = I_d$$

One parity check matrix H can be constructed using equations (1), (2), (3a), and (7) and as presented in FIG. 4.

It will be appreciated that $\alpha^i$ for any i is an 8-digit binary column vector. All the other blank spaces in the H matrix are 0's. The upper row represents the parity relation (EXCLUSIVE-OR equation) between parity vector P and bytes C, $B_1$-$B_7$, each "1" signifying terms in the parity equations. The parity $1_d$ matrix on the right-hand portion of the upper row shows that each parity bit in the P vector is parity on the bytes C, $B_1 \ldots B_7$, respectively. In the lower row, the box under byte C is the identity matrix $I_d$ showing the relationship between check byte C with bytes $B_1 \ldots B_7$. Under $B_1$ is matrix $T^1$, $B_2$ is $T^2$, etc. Element $\alpha^9$ under $B_2$ is $\alpha^8$ under $B_1$ shifted (multiplied) by T) one place in a linear feedback shift register. Later, numerical examples will more fully illustrate $T^0 \ldots T^7$. One arbitrary relationship of C-$B_7$ to tape signals is shown in FIG. 3. The actual binary values of check byte C are determined by EXCLUSIVE-OR relationship of $B_1$-$B_7$ and $T^1$-$T^7$.

ERROR CORRECTION CAPABILITY

Before showing identicalness (orthogonal symmetry) between the matrices of FIGS. 4 and 6, error modes and data manipulations for error control are discussed.

The most common errors in tapes are burst errors in a given track. A burst error affects every track byte in a fixed bit position i where i is the lowest number of the track in error, 0–7. The parity track P is not included in the matrix multiplication. The respective collections of eight bits, C(i), $B_1$(i), . . . $B_7$(i), in such tracks are denoted by $Z_i$, such as $Z_0$, $Z_1$, $z_2$, $Z_3$, $Z_4$, $Z_5$, $Z_6$, $Z_7$, shown in FIG. 6. The 8-bit row or horizontal vector $Z_i$ is located in track i and hence consists of the bits C(i), $B_1$(i), $B_2$(i), . . . $B_7$(i) of the bytes C, $B_1$, $B_2$, . . . $B_7$, respectively. In order to facilitate error correction for burst errors along the horizontal or track direction, the parity check error correcting equations are expressed in terms of the $Z_i$ and P horizontal vectors rather than as vertical vectors used in the residue calculation. This can be done be rearranging the columns (C-$B_7$) of the parity check matrix of FIG. 4 to correspond to the $Z_i$ vectors (track vectors) shown in FIG. 6. Such a partitioned matrix corresponding to a vector $Z_i$ has the form:

$$[I_8/\alpha^i \alpha^{1+1} \ldots \alpha^{1+7}]$$

where $I_8$ is the identity matrix degree 8. The parity check equations written from the H matrix of FIG. 6 are:

$$Z_0 \oplus Z_1 \oplus Z_2 \oplus Z_3 \oplus Z_4 \oplus Z_5 \oplus Z_6 \oplus Z_7 \oplus P = \emptyset \tag{8}$$

and:

$$T^0 Z_0 \oplus T^1 Z_1 \oplus T^2 Z_2 \oplus T_3 Z_3 \oplus T^4 Z_4 \oplus T^5 Z_5 \oplus T^6 Z_6 \oplus T^7 Z_7 = \emptyset \tag{9}$$

where 0 is an 8-digit column-vector with all zeroes.

FIGS. 4 and 6 show two parity check matrices for the FIG. 2 illustrated signal set. The FIG. 4 check matrix is byte oriented, while the FIG. 6 check matrix is track oriented. It will be shown that for each data bit in $B_1 \ldots B_7$ there is a given relationship to C; the same relationship exists for the same data bit when calculations are track oriented as shown in FIG. 6. This is orthogonal symmetry.

Take any data bit from FIG. 2 and examine same in both FIGS. 4 and 6; the identicalness of its relationship to the error correcting redundancy becomes apparent. Bit 54 ($B_4(5)$) in FIG. 4 is in byte $B_4$ at bit position 5. In matrix $T^4$, the fifth column vector is $\alpha^8$. Vector $\alpha^8$ (fifth column from left in $T^4$) relates bit 5 to C. In FIG. 6, bit 54 is $Z_6(4)$. This bit is in the column for $\alpha^8$ (fourth column from left in $T^5$) and relates to C in the same manner as in FIG. 4 check matrix. A complete examination will show the above analysis for all data bits.

The above orthogonally symmetrical relationship is also established by noting the relationship of the $\alpha$ column vectors in FIGS. 4 and 6. In FIG. 4, byte $B_2$ has its bits associated with check byte C via $\alpha^2 \ldots \alpha^9$, respectively. FIG. 6, byte $B_2$ is associated with the third row of 1's from the top in the upper portion, i.e., the third bit position of each track vector $Z_0 \ldots Z_7$. Accordingly, in FIG. 6, the third $\alpha$ column vector in each matrix $T^0 \ldots T^7$ is similarly associated with byte $B_2$, which yields $\alpha^2 \ldots \alpha^9$, respectively, in $T^0 \ldots T^7$. The conclusion is that each data bit in $B_2$ relates to check byte C in the same manner whether parity check matrix H of FIG. 4 or 6 (byte or track oriented) is used. Such is orthogonal symmetry. The same analysis follows for all bits in $B_1 \ldots B_7$ with respect to C.

A corollary is that each bit in byte C is related to a set of bits in an identical manner by both check matrices. Take bit 2C. In FIG. 4, bit C(2) relates to $\alpha^2$ in $I_d$:

$$C(2)=B_1(1)\oplus B_2(0)\oplus B_3(7)\oplus B_4(6)\oplus B_5(5)\oplus B_6(4)\oplus B_7(3)\oplus B_6(7)\oplus B_7(6)\oplus B_7(7);$$

noting that bit 0 is in $Z_0$, 1 in $Z_1$, etc. In the FIG. 1 notation:

$$C(2)=11\oplus 02\oplus 73\oplus 64\oplus 55\oplus 46\oplus 37\oplus 76\oplus 67\oplus 77$$

For $g(x)=1+x^3+x^4+x^5+x^6$ only; $\alpha^2$, $\alpha^{10}$, $\alpha^{13}$, and $\alpha^{14}$ contain a 1 in the third (bit 2) position.

In FIG. 6, C(2) is aligned with $T^2$, not $I_d(T^0)$:

$$C(2)=Z_0(2)\oplus Z_1(1)\oplus Z_3(7)\oplus Z_4(6)\oplus Z_5(5)\oplus Z_6(4)\oplus Z_7(3)\oplus Z_6(7)\oplus Z_7(6)\oplus Z_7(7).$$

Since C is byte 0, the first bit in each track Z is in $B_1$, etc., as noted at the right-hand margin of FIG. 6. In the FIG. 2 notation:

$$C(2)=02\oplus 11\oplus 37\oplus 46\oplus 55\oplus 64\oplus 73\oplus 67\oplus 76\oplus 77.$$

Since, in modulo 2 addition, the order of terms does not alter the answer, the check-bit-to-data-bit relationships are orthogonally symmetrical for check bit C(2). Such symmetry for C(0) is shown in FIG. 2 as the hatched bit signals; i.e.,:

$$C(0)=0C\oplus 71\oplus 62\oplus 53\oplus 44\oplus 35\oplus 26\oplus 17\oplus 74\oplus 65\oplus 56\oplus 47\oplus 75\oplus 66.$$

In a similar manner, C(1) symmetry is shown below using the FIG. 3 geometry and the corresponding $\alpha$ column vectors.

| | | | | | | | |
|---|---|---|---|---|---|---|---|
| — | 01 | — | — | — | — | — | — |
| * | — | — | — | — | — | — | — |
| — | — | — | — | — | — | — | 27 |
| — | — | — | — | — | — | 36 | — |
| — | — | — | — | — | 45 | — | — |
| — | — | — | — | 54 | — | — | 57 |
| — | — | — | 63 | — | — | 66 | 67 |
| — | — | 72 | — | — | 75 | 76 | 77 |

where * is the check bit.

The line of symmetry is between upper left and lower right corners of the array, also as shown in FIG. 2. Using the same geometry, such symmetry is shown for all check bits.

| | | | | | | | | |
|---|---|---|---|---|---|---|---|---|
| For C(2): | — | — | 02 | — | — | — | — | — |
| | — | 11 | — | — | — | — | — | — |
| | * | — | — | — | — | — | — | — |
| | — | — | — | — | — | — | — | 37 |
| | — | — | — | — | — | — | 46 | — |
| | — | — | — | — | — | 55 | — | — |
| | — | — | — | — | 64 | — | — | 67 |
| | — | — | — | 73 | — | — | 76 | 77 |
| For C(3): | — | — | — | 03 | — | — | — | — |
| | — | — | 12 | — | — | — | — | 17 |
| | — | 21 | — | — | — | — | 26 | — |
| | * | — | — | — | — | 35 | — | — |
| | — | — | — | — | 44 | — | — | — |
| | — | — | — | 53 | — | | — | 57 |
| | — | — | 62 | — | — | — | 66 | 67 |
| | — | 71 | — | — | — | 75 | 76 | — |
| For C(4): | — | — | — | — | 04 | — | — | — |
| | — | — | — | 13 | — | — | — | 17 |
| | — | — | 22 | — | — | — | 26 | 16 |
| | — | 31 | — | — | — | 35 | 36 | — |
| | * | — | — | — | 44 | 45 | — | 47 |
| | — | — | — | 53 | 54 | — | 56 | 57 |
| | — | — | 62 | 63 | — | 65 | 66 | — |
| | — | 71 | 72 | — | 74 | 75 | — | — |
| For C(5): | — | — | — | — | — | 45 | — | — |
| | — | — | — | — | 34 | — | — | 17 |
| | — | — | — | 23 | — | — | 26 | 27 |
| | — | — | 32 | — | — | 35 | 36 | 37 |
| | — | 41 | — | — | 44 | 45 | 46 | 47 |
| | * | — | — | 53 | 54 | 55 | 56 | — |
| | — | — | 62 | 63 | 64 | 65 | — | — |
| | — | 71 | 72 | 73 | 74 | — | — | 77 |
| For C(6): | — | — | — | — | — | — | 06 | — |
| | — | — | — | — | — | 15 | — | — |
| | — | — | — | — | 24 | — | — | 27 |
| | — | — | — | 33 | — | — | 36 | 37 |
| | — | — | 42 | — | — | 45 | 46 | 47 |
| | — | 51 | — | — | 54 | 55 | 56 | 57 |
| | * | — | — | 63 | 64 | 65 | 66 | — |
| | — | — | 72 | 73 | 74 | 75 | — | — |
| For C(7): | — | — | — | — | — | — | — | 07 |
| | — | — | — | — | — | — | 16 | — |
| | — | — | — | — | — | 25 | — | — |
| | — | — | — | — | 34 | — | — | 37 |
| | — | — | — | 43 | — | — | 46 | 47 |
| | — | — | 52 | — | — | 55 | 56 | 57 |
| | — | 61 | — | — | 64 | 65 | 66 | 67 |
| | * | — | — | 73 | 74 | 75 | 76 | — |

From the above charts, it is seen that each check bit * is in a diagonal line of bits mathematically orthogonal to the line of symmetry and that all data bits are either in such line or in parallel lines all to one side (below, as shown) of the line including the check bit. For C(0) the transverse diagonal is the single check bit.

Examination of the above charts shows that shifting the matrices $T^0$–$T^7$ and hence shifting byte C from the left-hand column to other columns changes the bit pattern geometry, hence, changes the relationship between error mode and the error correction.

Based upon the above discussion and FIGS. 4 and 6, the following two fundamental theorems are promulgated.

ONE TRACK IN ERROR

Theorem 1

Any error pattern in any one vector along the horizontal dimension (along a record track from the $Z_1$ vectors) is detectable and correctabale.

Proof

A syndrome generated from any single track error pattern is a 16-digit binary vector formed by the linear combination of the columns of the H matrix (FIG. 6) corresponding to the digit positions in error. Let $S_1$ and $S_2$ denote the two parts of the syndrome corresponding to the upper and lower eight rows of the FIG. 6 H matrix, respectively. Assuming only one vector is in error, $S_1$ uniquely determines the data error pattern e.

$$S_1 = e_1 = \begin{bmatrix} e(0) \\ e(1) \\ . \\ . \\ e(7) \end{bmatrix}$$

wherein $e_1$ is the error pattern; e(0) . . . e(7) are the error patterns for bytes 0–7. $S_1$ is the same as the error pattern developed in prior one-half inch tape recorders using the above-referenced VRC systems. $S_2$ is formed by the linear combination:

$$S_2 = e(0)\cdot\alpha^i \oplus e(1)\cdot\alpha^{i+1} \oplus \ldots e(7)\cdot\alpha^{i+7} \quad (10)$$

if vector $Z_i$, i=0 . . . 7, is in error; $S_2=0$ if P is in error ($S_2$ only relates to $Z_0$–$Z_7$, not P).

Equation (10) can be written in terms of the algebra of GF($2^8$) elements:

for i=0–7: $S_2=\alpha^i\cdot e$ for i=8: $S_2=0$

The theorem also shows that track i is not ambiguous by showing that for any track j not in error, i is unique. Let j denote a horizontal vector not in error (track not in error). That is, for $j\neq i$, we have $0\neq\alpha^i\neq\alpha^j$. Also, $e_1\neq$. Hence, $S_2$ uniquely determines i to rigorously identify the erroneous horizontal vector.

TWO TRACKS IN ERROR

Theorem 2:

Any error patterns in any identified two vectors along the horizontal dimension (tracks) are correctable (note that tracks in error are detected or identified by operation of pointer apparatus independent the error correction apparatus). The two tracks in error are separately indicated, for example, by pointers in accordance with Hinz, Jr., supra. Such pointers indicate low-quality signal processing; hence, the probability of error is much greater than in those tracks without such pointers.

Proof:

Let $e_1$ and $e_2$ respectively denote two error patterns, respectively, for two tracks in error, herein identified as tracks i and j, respectively. Again, taking the linear combination of the corresponding columns of the FIG. 6 H matrix, we have:

for all cases: $S_1=e_1\oplus e_2$ (11)

for $j\neq 8$: $S_2=\alpha^i\cdot e_1\oplus\alpha^j\cdot e_2$ (12a)

for j=8: $S_2=\alpha^i\cdot e_1$ (12b)

For $j\neq i$, equations (11) and (12a) are independent equations in GF($2^8$) yielding a unique solution. The error patterns are thus uniquely determined as:

for $j\neq 8$: $e_2=(S_1\oplus\alpha^{-i}S_2)/(\alpha^0\oplus\alpha^{j-i})$ j=8: $e_2=S_1\oplus\alpha^{-i}S_2$ for all cases: $e_1=S_1\oplus e_2$ The multiplication and inverse of the vectors are the field operations in GF($2^8$).

IMPLEMENTATION

The coded message can be generated using any irreducible binary polynomial g(x). For the preferred tape embodiment, Table 1 gives the irreducible polynomials of degree 8 with their exponents. Choice of g(x) of degree 8 from this set could be arbitrary; however, for tape recorders, there is an advantage in choosing a self-reciprocal polynomial or one with a lower value of exponent. Such a choice facilitates error correction during backward read as desired for digital tape recorders. In Table 1, polynomial numbers 8 and 16 are self-reciprocal and have the lowest value of exponent. Reciprocal polynomial $g(x)=x^8\cdot g(1/x)$ is also irreducible and has the same exponent as g(x).

Table 1

| Polynomial No. | Irreducible Polynomials of Degree 8 — Coefficients of the Polynomial | | | | | | | | | Exponent |
|---|---|---|---|---|---|---|---|---|---|---|
| | $g_0$ | $g_1$ | $g_2$ | $g_3$ | $g_4$ | $g_5$ | $g_6$ | $g_7$ | $g_8$ | g |
| 1 | 1 | 0 | 0 | 0 | 1 | 1 | 1 | 0 | 1 | 255 |
| 2 | 1 | 0 | 1 | 1 | 1 | 0 | 1 | 1 | 1 | 85 |
| 3 | 1 | 1 | 1 | 1 | 1 | 0 | 0 | 1 | 1 | 51 |
| 4 | 1 | 0 | 1 | 1 | 0 | 1 | 1 | 1 | 1 | 255 |
| 5 | 1 | 1 | 0 | 1 | 1 | 1 | 1 | 0 | 1 | 85 |
| 6 | 1 | 1 | 1 | 1 | 0 | 0 | 1 | 1 | 1 | 255 |
| 7 | 1 | 0 | 0 | 1 | 0 | 1 | 0 | 1 | 1 | 255 |
| 8 | 1 | 1 | 1 | 0 | 1 | 0 | 1 | 1 | 1 | 17 |
| 9 | 1 | 0 | 1 | 1 | 0 | 0 | 1 | 0 | 1 | 255 |
| 10 | 1 | 1 | 0 | 0 | 0 | 1 | 0 | 1 | 1 | 85 |
| 11 | 1 | 0 | 1 | 1 | 0 | 0 | 0 | 1 | 1 | 255 |
| 12 | 1 | 0 | 0 | 0 | 1 | 1 | 0 | 1 | 1 | 51 |
| 13 | 1 | 0 | 0 | 1 | 1 | 1 | 1 | 1 | 1 | 255 |
| 14 | 1 | 0 | 1 | 0 | 1 | 1 | 1 | 1 | 1 | 255 |
| 15 | 1 | 1 | 1 | 0 | 0 | 0 | 0 | 1 | 1 | 255 |
| 16 | 1 | 0 | 0 | 1 | 1 | 1 | 0 | 0 | 1 | 17 |

The above irreducible polynomials, having an exponent value of 255 are primitive polynomials. When such primitive polynomials are selected, any one of the 255 $\alpha$ column vectors may be chosen for practicing the present invention. In the other nonprimitive polynomials, a number of $\alpha$ column vectors up to the exponent value may be used.

a. Encoding (Generations of check bit and parity check residues)—From the prior theoretical description, check byte C is computed from the information bytes $B_1$, $B_2$, $B_3$, . . . $B_7$ and the companion matrix, such as the one selected above, according to equation (3a). Such encoding is accomplished by means of linear feedback shift register 10 shown in FIGS. 7 and 8.

Figure 8:
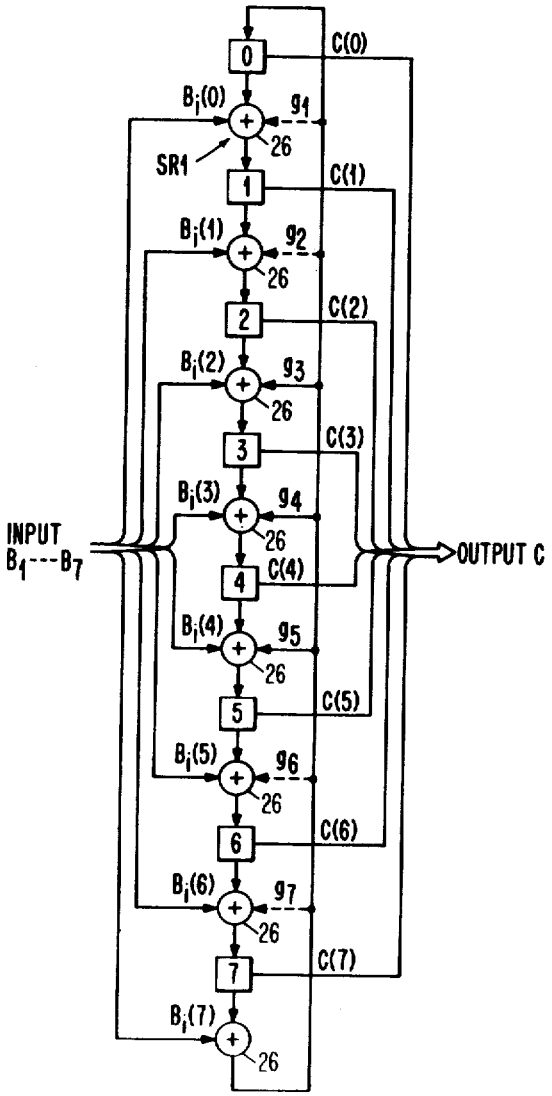
FIG. 8 is a schematic representation showing the shift register mechanization for the encoding of the information.

Shift register 10 contains eight binary storage elements or stages (0) . . . (7), one for each data track 0–7, with appropriate feedback connection 24 and modulo 2 summing networks 26 intermediate the binary storage elements. Under a timing control signal, the shift register synchronously shifts the contents of one stage to the next stage while simultaneously receiving a new input and feeding back as explained for FIG. 8. Shift register devices of this type are widely known and, given the feedback connections made in accordance with polynomial g(x), are easily constructed from available logic hardware in many different ways. Referring to FIG. 8, input data bytes $B_0$–$B_7$ are sequentially supplied to the shift register with the $B_7$ byte being entered first. All bits 0–7 of each byte are simultaneously applied to modulo 2 summers 26 at the outputs of stages 0–7, respectively, of shift register 10. That is, each bit 0 of bytes $B_7$ to $B_1$ are sequentially applied to the modulo 2 summer 26 receiving the output of stage 0, etc. Therefore, at the input to each modulo 2 adder 26, there is the respective bit of each byte. Each of the modulo 2 adders 26 receive signals from feedback 24 and the indicated shift register stage. The output from each adder element 26 goes to the next shift register stage so that the contents are successively shifted from stage to stage through the entire shift register. The feedback connections are determined by the binary coefficients $g_0, g_1, \ldots g_7$ of the polynomial g(x) where:

$g(x)=1+g_1x+g_2x^2+g_3x^3+g_4x^4+g_5x^5+g_6x^6+g_7x^7+x^8$ A "one" coefficient ($g_i=1$) in the equation represents a closed or completed connection and a "zero" coefficient ($g_i=0$) represents an open or no connection. When $g(x)=1+x^3+x^4+x^5+x^8$, the feedback connections corresponding to $g_3=g_4=g_5=1$ or $x^3$, $x^4$, $x^5$ are completed; the remaining are open or no connection as indicated in FIG. 8, respectively, by solid and dashed lines. At the end of seven cycles, each stage of the shift register contains one bit of vector C. With respect to equation (3a), each shifting operation corresponds to multiplying the shift register byte content vector by a companion matrix T; two shifts is a multiplication by $T^2$, etc. Input connections are such that the entering vector is premultiplied by the matrix T. Initially, this shift register 10, called SR1, contains all 0's. The information bytes $B_7$, $B_6$, $B_5$, $B_4$, $B_3$, $B_2$, and $B_1$ are successively shifted into SR1 in that order. Thus at the end of seven shifts, SR1 contains the column vector:

$$TB_1 \oplus T^2B_2 \oplus T^3B_3 \oplus \ldots \oplus T^7B_7,$$

the check byte C. C is then gated out. The byte or vertical parity of $B_7, B_6, \ldots B_1$, and C is computed as in previous systems and as diagrammatically shown in FIG. 9. The column vector or check byte C is calculated on a byte-by-byte (vertical serial) basis, while correction is on a track ($Z_i$) or horizontal basis. Remember, the data-bit-to-check-bit relationship has an orthogonal symmetry to enable such transverse operations.

Figure 5:
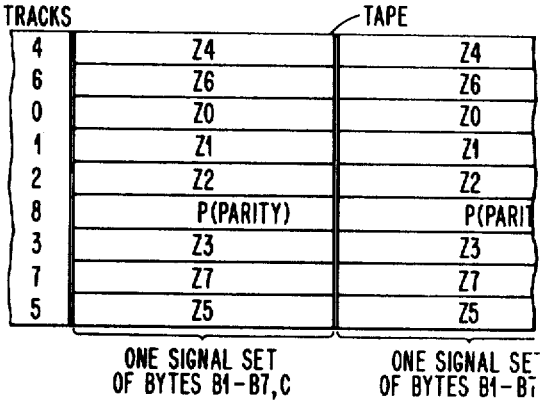
FIG. 5 is a schematic representation of the 9-track system showing the data arranged in the longitudinal or track-length direction.

Check byte C contains the check bits resulting from implementing equation (3a) and is respectively associated with the information or data signals in a particular track or channel. Also, the parity bit signals for the cross-track or vertical information signals are located in a separate track P.

b. Decoding (Error syndrome generation)—Let $Z_0$, $Z_1$, $Z_2$, $Z_3$, $Z_4$, $Z_5$, $Z_6$, $Z_7$, and P denote the received signals of tracks 0–P and corresponding to the original signals for each track $Z_0, Z_1, \ldots Z_7$, and P, respectively, and hereinafter termed received track signals (see FIG. 5). It will be appreciated that some received signals may contain errors. The syndrome $S_1$, $S_2$ can be generated by processing the received signals according to the checking rules expressed in track or horizontal-oriented equations (8) and (9). The two received signal syndrome vectors $S_1$ and $S_2$ are:

$$S_1=Z_0\oplus Z_1\oplus Z_2\oplus Z_3\oplus Z_4\oplus Z_5\oplus Z_6\oplus Z_7\oplus P \quad (13)$$

$$S_2=T^0Z_0\oplus T^1Z_1\oplus T^2Z_2\oplus T^3Z_3\oplus T^4Z_4\oplus T^5Z_5\oplus T^6Z_6\oplus T^7Z_7 \quad (14a)$$

Calculation of $S_2$ is based on track or horizontal vectors rather than byte or vertical vectors by transforming the FIG. 4 matrix to the illustrated FIG. 6 form. That is, syndrome generation is done by means for decoding the H matrix shown in FIG. 6. The transformation of the H matrices is important in that the syndrome $S_1$, $S_2$ and eventual error patterns, $e_1$, $e_2$, are obtained by using the serial operable decoding H matrix so that the eventual error correction can be done on the Z horizontal vectors which are along the tape tracks, respectively. Furthermore, it allows serial encoding/decoding processes by means of cross-track bytes (vertical) which require minimum buffering of the information signals, hence, reduce cost of implementation. Thus, the transformation of the H matrices saves considerable time and effort in encoding while providing correction of the several tracks in error.

According to this invention, $S_2$ is obtained from the received byte vectors C, $B_1$, $B_2$, $B_3$, $B_4$, $B_5$, $B_6$, $B_7$ using the equation:

$$S_2=C\oplus T^1B_1\oplus T^2B_2\oplus T^3B_3\oplus T^4B_4\oplus T^5B_5\oplus T^6B_6\oplus T^7B_7 \quad (14b)$$

Figure 11:
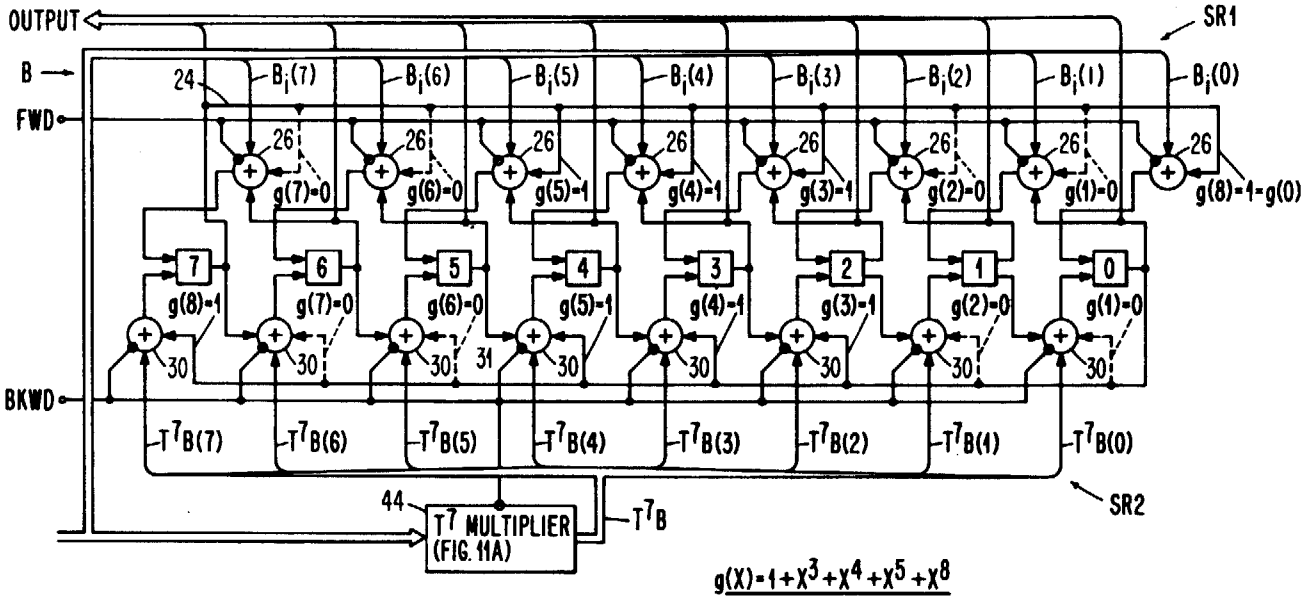
FIG. 11 is a schematic block diagram showing a feedback shift register for decoding.
Figure 11A:
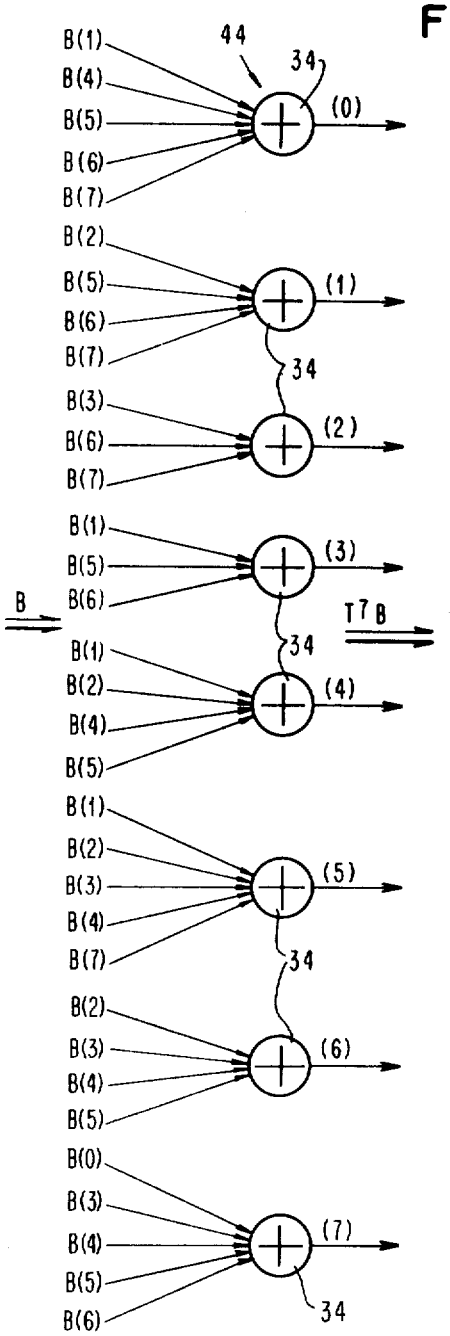
FIG. 11a is a schematic block diagram showing the $T^7$ multiplier of FIG. 11 and the $T^7$ matrix indicating the various connections of the multiplier.

$S_2$ can be generated using a circuit similar to that used in encoding, i.e., forward shifting $B_7 \ldots C$. However, a backward shifting register C to $B_7$ saves decoding time in the error correction process and, accordingly, a method of generating $S_2$ using a backward shifting register is preferred. For this purpose the syndrome equation is rewritten as:

$$S_2=T^{-7}[T^7C]\oplus T^{-6}[T^7B_1]\oplus T^{-5}[T^7B_2]\oplus \ldots \oplus[T^7B_7] \quad (14c)$$

wherein the negative exponents of each matrix T indicate backward shifting. The feedback connections are made according to g(x) Table 1); however, the shifting operation is backwards and corresponds to multiplying the shift register content vector by the matrix $T^{-1}$, the inverse of the matrix T. The entering vector is premultiplied by the matrix $T^7$ using a network of EXCLUSIVE-OR gates (FIG. 11a). The backward shift register (SR2) is shown in FIG. 11. For backward shifting, the received bytes C, $B_1$, $B_2$, $B_3$, $B_4$, $B_5$, $B_6$, $B_7$ are successively shifted into SR2 in that order.

In a practical embodiment, equation (14b) represents operation in a so-called forward direction wherein the byte order is $B_7$, $B_6$, $B_5$, $B_4$, $B_3$, $B_2$, $B_1$, C; while (14c) represents operation in a so-called backward direction wherein the byte order is C, $B_1$, $B_2$, $B_3$, $B_4$, $B_5$, $B_6$, $B_7$.

Figure 12:
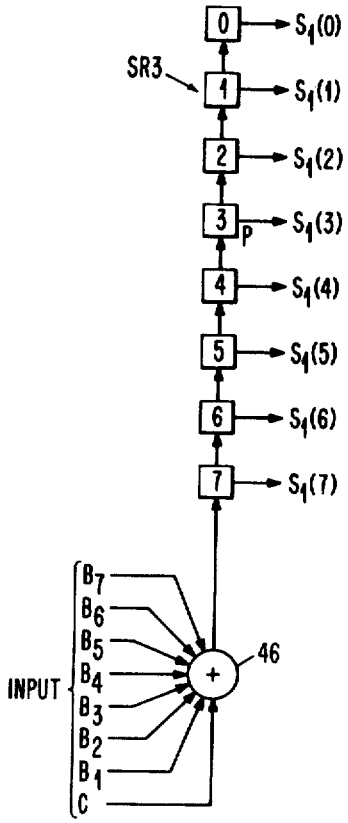
FIG. 12 is a schematic block diagram showing the shift register SR3 for decoding.

$S_i$ is computed using an EXCLUSIVE-OR network 46 feeding a shift register SR3 shown in FIG. 12.

c. Generation of Error Patterns ($e_1$, $e_2$)—If the received data is error free, then the check equations will be satisfied and the syndromes $S_1$ and $S_2$ will both be zero. A nonzero $S_1$ or $S_2$ indicates that the received data signals are not correct. In accordance with the error correction capability of the code, we assume that $S_1=S_2=0$ indicates no error and $S_1$ or $S_2 \neq 0$ indicates one or two tracks in error (one or two horizontal burst errors). These erroneous tracks are designated by track numbers i (first and lower numbered track in error) and j (second and higher numbered track in error) and are identified by signal quality pointer signals $Q_i$ and $Q_j$ in the form of logical "1" for low quality, i.e., possible error conditions in tracks i and j, respectively. For convenience, it is arbitrarily required that $i \leqq j$ where $0 \leqq i \leqq 7$ and $0 \leqq j \leqq 8$. The code is capable of determining the error patterns $e_1$ and $e_2$ ($e_2=0$ if $i=J$) corresponding to the tracks i and j, respectively.

The quality pointer signals are derived from the system in which the error correction is taking place. Of course, there are various means of generating "pointer" signals such as is set forth in Hinz, Jr., supra. In this application, the quality of the record/readback operations on a real-time basis is used as quality pointers to possible error conditions. The error correction apparatus also generates error pointers, hereinafter termed "code pointers".

The syndromes $S_1$, $S_2$ generated from the encoded data bytes 0–7 and check byte C are functions of the errors therein. Such errors are represented by error patterns $e_1$ and $e_2$, respectively, for track signal vectors $Z_i$ and $Z_j$ respectively from tracks i and j (when $i=j$, $e_2=0$, there is only one track in error). The received track signals $Z_i=Z_i \oplus e_1$ and $Z_j=Z_j \oplus e_2$. The error correction in tracks i and j is accomplished by EXCLUSIVE-OR'ing the error patterns with the received track singals in error to reconstruct correct track signals. From equations (8), (9), (13), and (14a), $S_1$ and $S_2$ have the algebraic equivalents:

$$S_1=e_1 \oplus e_2$$

for $i \neq j \neq 8$:

$$S_2=T^i e_1 \oplus T^j e_2$$

for $j=8$; $j=i$:

$$S_2=T^i e_1$$

$S_2=0$ and $j=8$ or $j=i$ indicates absence of any errors in the information tracks 0–7; hence, no data corrections are needed. Solving for $e_2$ we get:

$$e_2=M_{j-i}[S_1 \oplus T^{-i} S_2] \tag{15}$$

where:

for $j \neq i \neq 8$:

$$M_{j-i}=[I_d+T^{j-i}]^{-1} \tag{16a}$$

for $j=i$ or $j=8$:

$$M_{j-i}=I_d \tag{16b}$$

wherein $I_d$ is an identity matrix; $M_{j-i}$ is a matrix obtained from $T^{j-i}$ for $j-i=1, 2, 3, 4, 5, 6, 7$.

Figure 15:
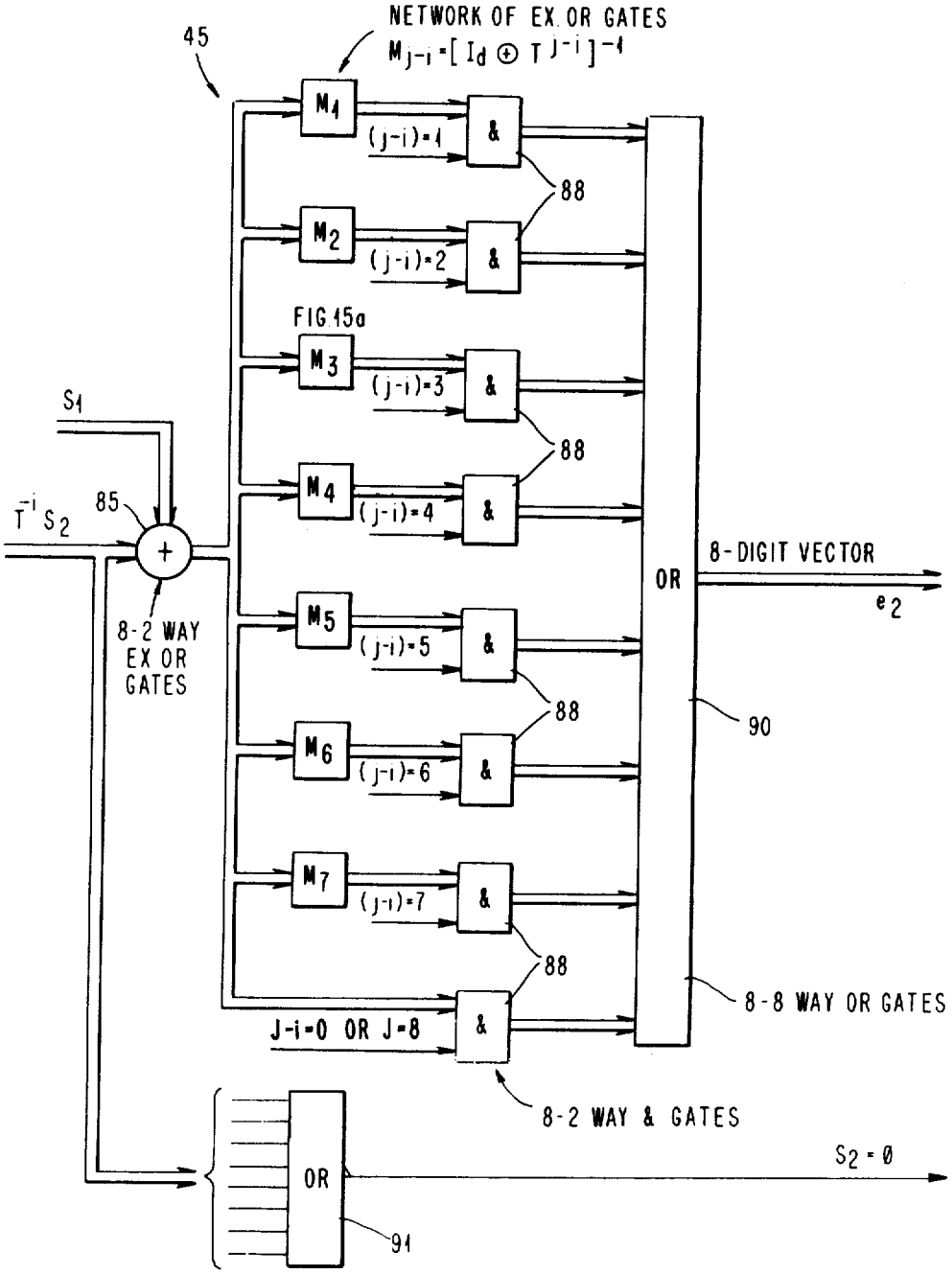
FIG. 15 is a schematic diagram showing the error pattern generator of FIG. 10.

Equation (15) can be realized in the following manner: $T^{-i}S_2$ is obtained by backward shifting SR2 i times with $S_2$ as initial content. FIG. 15 shows the circuit which takes $S_1$, $T^{-i}S_2$, and the number $j-i$ as input and computes $e_2$. The blocks $M_{j-i}$ for $j-i=1, 2, 3, 4, 5, 6, 7$ are networks (FIG. 15) consisting of EXCLUSIVE-OR gates realizing the matrices $M_{j-i}$ of equation (16a) as later set forth for one shift register implementation.

When only one track is in error (the case with $i=j$ and $e_2=0$), the error correction apparatus generates its own code track in error pointer. Since the code pointer is rigorous, the quality pointers are ignored. The single track code pointer can be generated by solving equation (15) for the index (track) i with $e_2=0$ and $j-i=0$, i.e., find i such that:

$$e_2=M_0(S_1 \oplus T^{-i}S_2)=0 \tag{17}$$

This is done by counting the number of shifting operations (matrix multiplications) of SR2 (with $S_2$ as initial content) while examining the output $e_2$ of the circuit of FIG. 15 for $e_2=0$ or $S_1=T^{-i}S_2$ (from 17). If $e_2$ does not equal zero after a maximum of seven shifts ($j-i \neq 1$, 2, 3, 4, 5, 6, or 7) and also $S_2 \neq 0$, then there are two or more tracks in error. When $S_2=0$ and $e_2 \neq 0$, this indicates errors in the parity track 8 only.

d. Correction of Tracks in Error—Using the error pattern $e_2$ and the syndrome $S_1$, the erroneous track signals $Z_i$ and $Z_j$ can now be corrected to produce the corrected track signals $\hat{Z}_i$ and $\hat{Z}_j$ as follows:

$$\hat{Z}_i=Z_i \oplus S_1 \oplus e_2 \tag{18}$$

$$\hat{Z}_j=Z_j \oplus e_2 \tag{19}$$

AN IMPLEMENTATION OF THE ENCODER

Figure 7:
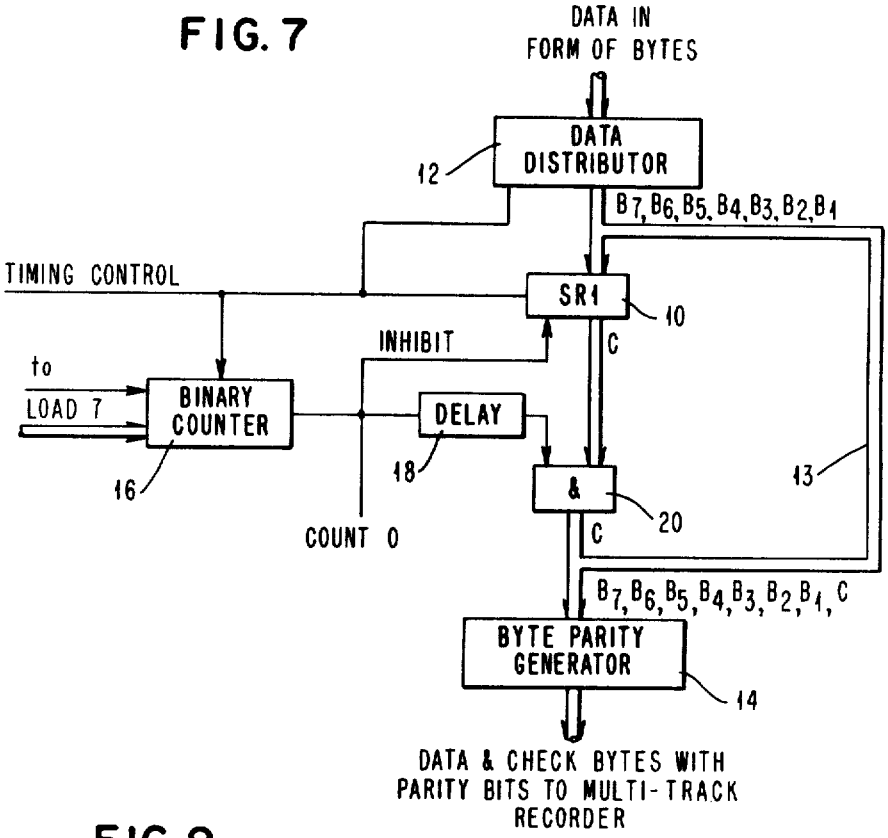
FIG. 7 is a block diagram of the encoder.

Referring to FIG. 7, there is shown a block diagram of an encoder for the system. We will describe encoding for one set of input data bytes $B_{1-7}$, it being understood the encoding operation is repeated many times during recording one record block of signals. The encoder generates check byte C from the input serially received data or information bytes $B_1, B_2, B_3, \ldots B_7$ according to equation (3a) and also attaches a parity bit to each 8-bit byte $B_1, B_2, \ldots B_7$ and C, yielding eight bytes of nine bits each for recording. The input data bytes are fed into data distributor 12 under control of a timing control signal. Data bytes $B_7, B_6, B_5, \ldots B_1$ go to linear feedback shift register SR1 10 from data distributor 12 in that order. The matrix multiplications as described in encoding are performed. From these data bytes, shift register SR1 10 serially generates check byte C. This check byte is then appended to the data bytes at the output of AND circuit 20. Simultaneous with the generation of the check byte C, the parity bit for each of the input data bytes $B_7$, $B_6$, etc., are generated; then the parity bit for check byte C is generated. The input data bytes $B_7, B_6, \ldots B_1$ are serially fed in that order to byte parity generator 14 via cable 13.

To sequence encoder operation for each set of input data bytes, at the start time of the encoder, $t_0$, binary counter 16 is preloaded to the value 7 and counts down in synchronism with the timing control signal to generate times $t_7 \ldots t_1$, respectively, for $B_{1-7}$. These timing control signals synchronously operate shift register 10 (SR1), and data distributor 12. When count 0 is reached, shift register 10 is inhibited from further shifting; while the contents of the shift register are supplied through AND circuit 20 after a unit timing cycle delay in delay 18. The details of the shift register SR1 for computing the check byte C are shown in FIG. 8. The feedback connections 24 are determined by the binary coefficients $g_1 \ldots g_7$ of the selected polynomial g(x). The "1" coefficient implies a closed connection (solid lines), and the "0" coefficient implies an open connection (dashed lines). After shifting operations, each stage of the shift register SR1 contains one digit of vector C. The shifting operation corresponds to multiplying the shift register content vector by the companion matrix T (see FIG. 4). Input connections are such that the entering vector is premultiplied by matrix T. Such premultiplication consists of connecting the inputs $B_i(0)$ to the input of one stage of the shift register and the successive $B_i$ inputs to the next higher order stage $i+1$. This connection is an effective one shift or a multiply by T—a premultiply. Initially, of course, shift register SR1 contains all 0's or other reference value.

Figure 9:
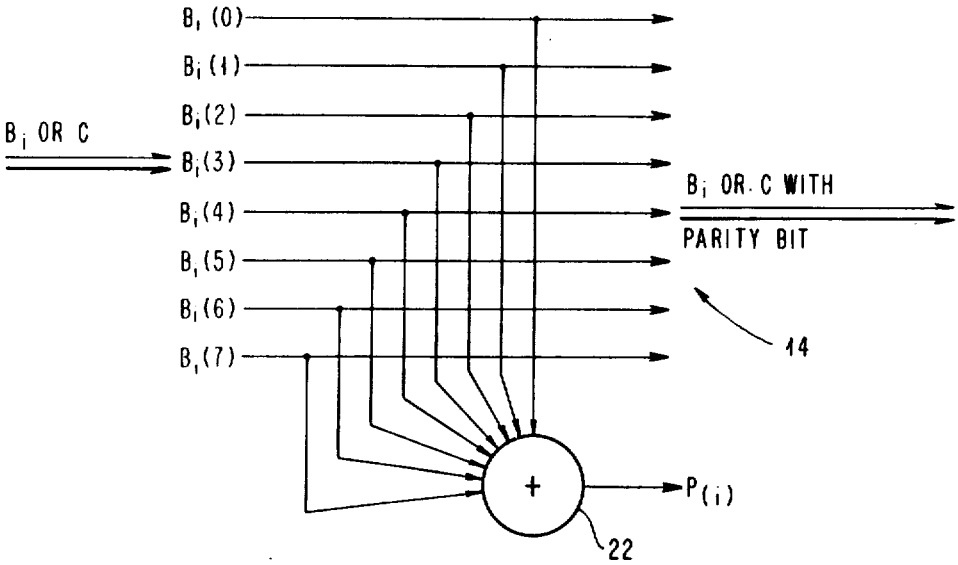
FIG. 9 is a schematic diagram of the byte parity generator shown in block form in FIG. 7.

The byte parity generator 14 is shown in FIG. 9. $B_i$ byte data bits (0) . . . (7) feed through the arrangement as well as being inputted to modulo 2 adder circuit 22, whose output represents the parity $P_{(i)}$ or P(C) of each input data byte. Accordingly, the output of the byte parity generator 14 is an 8-bit data byte or check byte plus the appropriate parity bit. The encoded message is fed in the present example to a multitrack recorder.

OPERATIONS OF THE DECODER (SYNDROME GENERATOR) AND ERROR CORRECTOR

Figure 10:
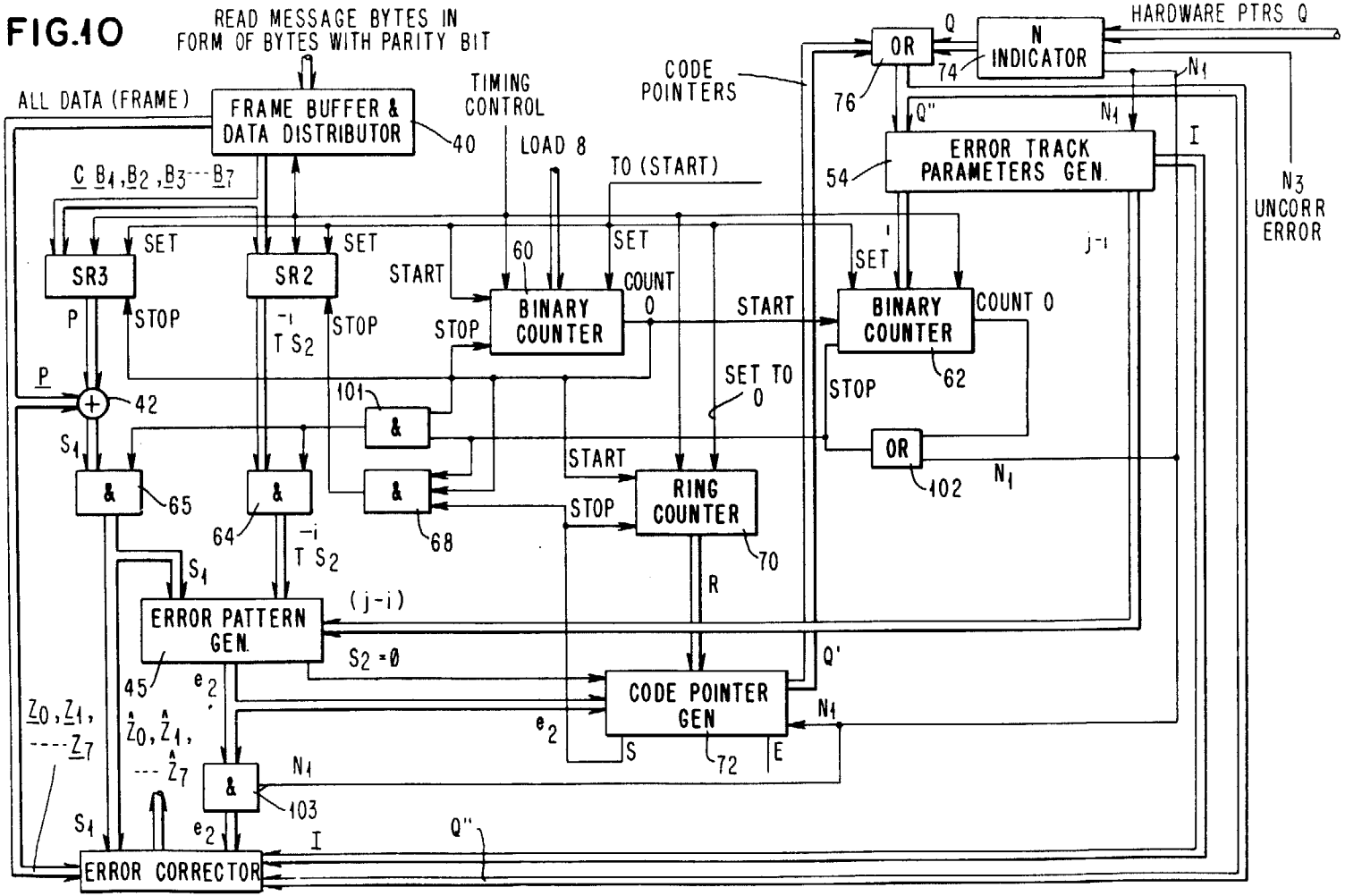
FIG. 10 is a schematic block diagram of the decoder and error corrector.

After the message has been encoded and recorded, reproduced signals from the recorded tape (not shown) are transmitted in 9-bit record byte serial form to decoder (FIG. 10). The readback byte sequence can be forward $B_7 \ldots C$ or backward $C \ldots B_7$. The decoding system is controlled by a timing control signal via binary control counter 60. At the beginning of each set of readback bytes, a start pulse (not shown) sets control counter 60 to its eighth state, signifying start decode time $t_0$ (control counter counts once for each data byte). Generation of such a start pulse can be done in the same way present-day digital readback circuits generate a start read pulse, such as in Floros, supra. Each timing control signal may be such start read pulse with control counter 60 having a count of 8. In this regard, control 60 not only sequences the decoder, but also indicates the format of the readback bytes. Synchronization of such a format counter is shown by Irwin in U.S. Pat. No. 3,641,534.

The received message bytes $B_1$, $B_2$, $B_3$, $B_4$, $B_5$, $B_6$, $B_7$ and C in either order are serially collected and deskewed in frame buffer 40 (Floros U.S. Pat. No. Re. 25,527). The corresponding signal quality pointers $Q_0$, $Q_1$, $Q_2$, . . . $Q_7$, and $Q_8$ are inputted to N indicator 74 or may be deskewed along with the received message bytes.

In response to the quality pointer signals, N indicator 74 generates signals $N_1$ and $N_3$ respectively indicating less than two and more than two tracks in error. Both $N_1$ and $N_3$ signals are logical 0 when exactly two track quality pointers have value 1 indicating two tracks having low quality signals. The two pointers Q, in that case, are passed on uninhibited by N indicator 74 through OR circuit 76 to the error track parameters generator 54. Signal $N_3=1$ denotes a multitrack error indicating an uncorrectable error status. Signal $N_1=1$ indicates only one track in error. If the code pointer points to a track different than one pointed to by a single quality pointer, then such two pointers can be combined. This latter practice is dangerous as to data integrity and should be avoided unless a comprehensive error detection system is employed in conjunction with the present error correction apparatus. For example, the system of U.S. Pat. No. 3,508,196 may be so used.

The FIG. 10 decoder first computes the syndromes $S_1$ and $S_2$ serially by received bytes in shift registers SR3 and SR2, as later described with respect to FIGS. 11 and 12. The read or received encoded message bytes C, $B_1$, $B_2$, $B_3$, $B_4$, $B_5$, $B_6$, $B_7$ are applied to the shift registers SR3 and SR2 in that order. As each 8-bit byte (excludes parity) of the input or readback message is received at the shift registers SR3 and SR2, the registers are synchronously shifted by means of the timing control signal. Forward-backward operations are described with respect to FIG. 11.

Binary control counter 60 zero count indicates all bytes $C \ldots B_7$ have been received. At this time, SR3 (FIG. 12) contains parity signals calculated based on received bytes. EXCLUSIVE-OR's 42 combine the calculated parity signals with the received parity tracks signals $B_7(8) \ldots C(8)$ generating vertical syndrome vector $S_1$ ready to be gated to error pattern generator 45 (FIG. 15). SR2 contains $S_2$ which is further processed to produce $T^{-i}S_2$ after i shifts.

For an error-free condition P=P yielding $S_1=0$; hence, no error indicating signals travel through AND's 65 to error pattern generator 45. Similarly, SR2 becomes all zeroes, as will become apparent, at the end of the checking calculation. With $S_2=0$, no error indicating signals are supplied to error pattern generator 45. As a result, code pointer generator 72 supplies no code pointer, allowing the received correct data signals to flow through error corrector 42 (FIG. 18) unchanged.

The case of less than two tracks in error indicated by the pointers Q is processed as follows. In this case, the N indicator produces the $N_1$ signal as a logical 1 and inhibits the external Q pointer from going to the OR gate 76. Instead, the system proceeds to generate code pointers Q' by means of the ring counter 70 and code pointer generator 72. FIG. 10 apparatus solves equation (17):

$$e_2=M_0(S_1 \oplus T^{-i}S_2)=0$$

Track i is identified by shifting $S_2$ i times ($e_2=0$). The ring counter 70 starts with a count 0 signal from counter 60. Simultaneously, the count 0 signal from counter 60 stops SR3 and, in conjunction with signal $N_1$ through OR gate 102 and AND gate 101, opens the gates 64 and 65. At this time, the syndromes $S_1$ and $T^{-0}S_2$ (i.e., $S_2$) appear at the output of gates 65 and 64, respectively. The timing control shifts the ring counter 70 and SR2 in synchronism each time increasing the count value in ring counter 70 and multiplying the contents of SR2 by $T^{-1}$. Thus, successively, the count increases as 0, 1, 2, . . . and the contents of SR2 become $T^{-0}S_2$, $T^{-1}S_2$, $T^{-2}S_2$, . . . Thus, in synchronism with the timing control signal, the output of the gate 64 changes successively as $T^{-0}S_2$, $T^{-1}S_2$, $T^{-2}S_2$, . . . .

Of course, the presence of the $N_1$ signal as a logical 1 produces the $j-i=0$ pointer coming from the error parameter generator 54. This signal opens the direct path (of matrix $M_0$=Identity) in the error pattern generator 45. As a consequence, the output $e_2$ of the error pattern generator 45 becomes successively $S_1 \oplus T^{-0}S_2$, $S_1 \oplus T^{-1}S_2$, $S_1 \oplus T^{-2}S_2$, etc., in synchronism with the timing signal. This signal $e_2$ is inhibited from reaching the error corrector 42 in the gate 103 by the $N_1$ signal. The $e_2$ signal, however, is fed to the code pointer generator 72. The code pointer generator 72 continually checks for $e_2=0$. When that occurs, i.e., when $e_2=S_1 \oplus T^{-8}S_2=0(S_1=T^{-i}S_2)$ at the $i^{th}$ timing control signal ($i<8$), the code pointer generator 72 produces the stop counter signal S which stops the ring counter 70 and the shift register SR2 by means of the AND gate 68. The ring counter count R, at this time, has value i and is indicated by signal $r_i$. This is passed on as code pointer Q' by means of the signals $e_2=0$ and $N_1$ with logical I in the code pointer generator 72. The code pointer Q' is fed through the OR gate 76 to the error track parameters generator 54. If the ring counter 70 reaches count 8 before the code pointer generator 72 finds $e_2$ with value 0, then the $r_8$ signal from count R of ring counter 70 produces a stop counter S signal and stops any further action in SR2 and ring counter 20. The signal $S_2=0$ is generated by the error pattern generator 45 continually and is provided to the code pointer generator 72. If this signal, $S_2=0$, is logically 0 and the code pointer generator finds ring counter count R reaching the value 8 when $e_2$ is not yet equal to 0, it is concluded that the error is in more than one track and, hence, is uncorrectable. This is indicated by the code pointer generator 72 providing a logical 1 value for the uncorrectable error signal E. If the signal $S_2=0$ has a logical 1 value, then the error is in the parity track. This is indicated by the code pointer generator providing the code pointer signal Q' with a logical 1 value for the signal $Q'_8$.

For two-track correction, counter 60 is utilized while ring counter 70 is utilized when there is only one or no track in error. The N indicator 74 generates the signals $N_1$ and $N_3$ indicating respectively less than two and more than two tracks in error. Both $N_1$ and $N_3$ signals are logical 0 when exactly two track pointers have value 1 indicating two erroneous tracks. The pointer Q, in that case, are passed on uninhibited by the N indicator through the OR circuit 76 to the error track parameters generator 54. The error track parameters generator provides the binary number i for the binary counter 62 and the $j-i$ control signal for the error pattern generator 45. Thus, the binary counter 62 is already set to number i when the count 0 signal from counter 60 starts the count down of counter 62. The shift register SR2 is shifted simultaneously in synchronism with the timing control. At count 0 of counter 62, the last shift of shift register SR2 results in $T^{-i}S_2$ as the contents of SR2. The count 0 signal from counter 62 passes through OR circuit 102 and the AND circuit 101 to open the gates 64 and 65, thus passing $S_1$ and $T^{-i}S_2$ on to the error pattern generator 45. The count 0 signal from counter 62 also stops any further action in counter 62 and shift register SR2.

The error pattern generator 45, on receiving $S_1$ and $T^{-i}S_2$ as inputs produces the error pattern $e_2$ using the control signal $j-i$ from the error track parameters generator 54. The syndrome $S_1$ and error pattern $e_2$ are passed on to the error corrector 42 through the open gates 65 and 103 to the error corrector.

The error corrector 42 utilizes the error pattern $e_2$ and the syndrome $S_1$ in making the error correction. The received data (with errors) is brought into the error corrector 42 from the frame buffer 40 and is provided to the various EXCLUSIVE-OR gates in the error corrector 42 as $Z_i$ vectors. The $Z_i$ character denotation is explained in the frame formate of FIG. 5. The first track pointers I are brought from the error track parameters generator, and the track pointers Q' come through the OR gate 76 either from the code pointer generator 72 or from external means through the N indicator. With the aid of these pointers, the erroneous characters $Z_i$ and $Z_j$ are corrected to $Z_i$ and $Z_j$. The other characters are passed on as corrected without making any change.

It will be appreciated that in the case of only one track error or no tracks in error, the corresponding values of $e_2$ and $S_1$ are 0 and, hence, the correction is properly effected by error corrector 42.

A better understanding of the operation of the error correction system may be obtained from the details of the various circuits forming the decoding system. The frame buffer and data distributor 40 can be of any known form capable of deskewing and distributing the information as required. It will be appreciated that the information input to the frame buffer and distributor 40 is in the form of 8-bit bytes each with a parity bit. The cross-track information is distributed to the shift registers SR3 and SR2 in parallel byte form as shown in FIG. 10 with the check byte first. A most basic storage and deskewing means would be a series of registers, one for each byte of information. The registers could be readable in the reverse direction as well as a direction orthogonal to the read-in direction to obtain the $Z_i$ information.

The shift register SR2 is shown in detail in FIG. 11. The information byte or check byte is shown as the input to a $T^7$ multipler 44, the details of which are given in FIG. 11a. The bits of the byte after multiplication by $T^7$ are utilized as inputs to modulo 2 adder circuits 20 associated with each of the storage stages of the shift register. The storage stages of the shift register are represented numerically by 0–7 corresponding to the 0–7 bits of the input byte. As was previously indicated in the theoretical discussion of the invention, feedback connections $g_1$ through $g_7$ are made in accordance with the value or 1 assigned to the term in the equation:

$$g(x)=1+g_1x+g_2x^2+g_3x^3+g_4x^4+g_5x^5+g_6x^6+g_7x^7+x^8.$$

If $g_i$ in the equation equals 0, this indicates no feedback connection; while $g_i=1$ indicates a feedback connection. It should be appreciated that this is a backward shifting register. That is, the shift is from the last stage 7 towards the first stage 0; and the feedback 31 to the appropriate stages is from the 0 stage. Each shift of the shift register is essentially multiplying the input by $T^{-i}$. The output of the shift register is essentially:

$$S_2=T^{-7}[T^7C]\oplus T^{-6}[T^7B_1]\oplus T^{-5}[T^7B_2]\oplus \ldots \oplus[T^7B_7]$$

The $T^7$ multiplier is shown in detail in FIG. 11a. The circuit consists of eight modulo 2 adders 34, the output of which represents the $0=7$ bits of the $T^7B$ byte. The input connections to the modulo 2 adder circuits 34 are made in accordance with the $T^7$ matrix shown in FIG. 11a. For example, the first row of the matrix contains 1's in the 1, 4, 5, 6, and 7 positions representing that a corresponding connection should be made to the zero modulo 2 adder. Similarly, the 1's in the other rows of the matrix represent corresponding connections to the other modulo 2 adders as marked. This circuit multiplies the B byte inputs by $T^7$.

The FIG. 11 illustrated circuit is usable for both read forward and read backward operations of a digital tape recorder. The upper connections, identical to and labeled SR1, provide operations in read forward (FWD). The FWD signal activates modulo 2 adders 26 to modulo 2 add the quantity $B_i$ to the other respective inputs to such circuits. The lower connections labeled SR2 include modulo 2 adders 30 enabled by the backward (BKWD) signal to operate as above described. Only SR1 or SR2 are enabled during a given time.

Generation of FWD and BKWD signals are from host CPU commands received by an I/O controller (not shown) respectively commanding read forward or backward.

FIG. 12 shows the shift register SR3 of the decoder. The input bytes C, $B_1$, $B_2$, . . . $B_7$ are connected to a modulo 2 adder circuit 46 in that order. The output of the modulo 2 adder circuit 46 is fed into the last stage, stage 7, of the shift register, SR3 from whence it is successively shifted up until the parity for the indicated bytes is in the corresponding stages of the shift register SR3. The output of each stage of the shift register is the appropriate bit which taken together form the parity byte P.

Figure 13:
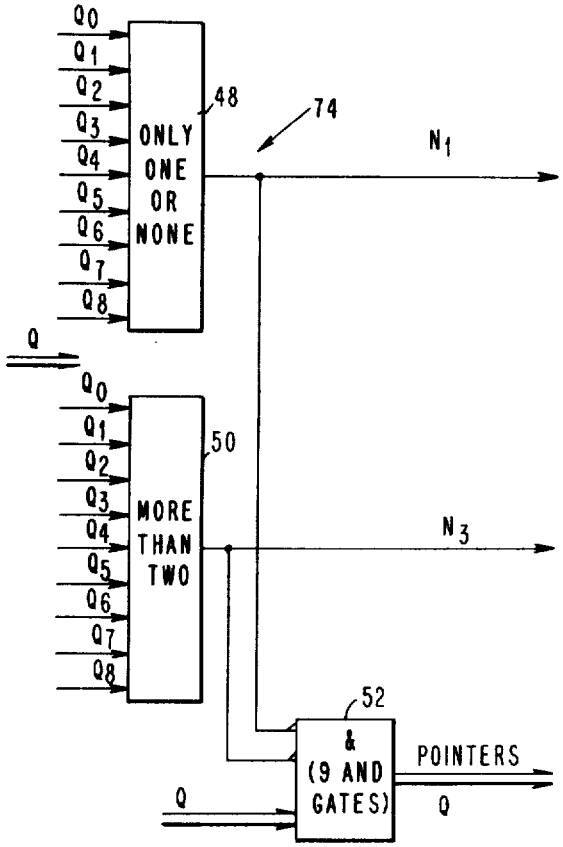
FIG. 13 is a schematic block diagram showing the details of the N indicator shown in FIG. 10.

FIG. 13 shows the N indicator circuit 74 which is capable of providing the control signals $N_1$, $N_3$, and the controlled pointers Q, $N_1$ indicates that only one track pointer or none are on. The $N_3$ signal indicates that more than two track pointers are on. The Q output represents the pointers $Q_0$ through $Q_8$. The $N_1$ output is obtained from an "only one or none" circuit 48 which has the pointers $Q_0$ through $Q_8$ as inputs thereto. The output $N_1$ will only be obtained from the circuit when only one of the pointer inputs thereto is energized or none of them are energized. The output $N_3$ is obtained from a "more than two" circuit 50 which is a threshold network capable of providing a logical 1 output when more than two of the inputs have logical 1's. The Q pointer output is obtained through AND gates 52 when $N_1$ and $N_3$ signals are not present.

Figure 14:
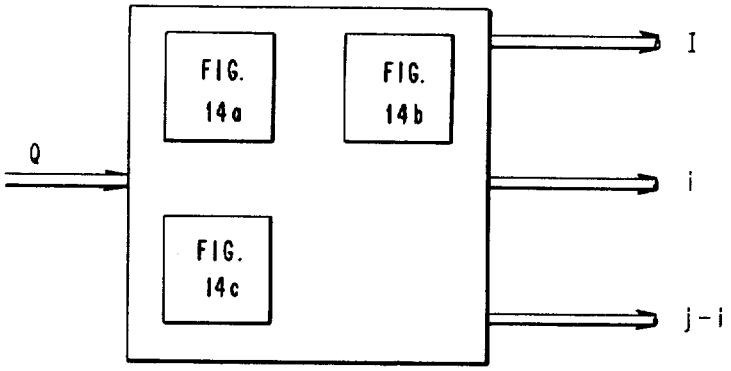
FIG. 14 is a diagram showing the layout of the FIGS. 14a, 14b, and 14c which form the error track parameters generator.

FIG. 14 shows schematically the error track parameters generator 54 which generates the code pointers 1 identifying the first erroneous data track which is called the $I^{th}$ track. It also generates the signals i as a binary number and the signals $j-i=0, 1, 2, 3, 4, 5, 6, 7$ from the input pointer signals Q. FIG. 14 indicates that the logic circuits 14a, 14b, and 14c are included in the error track parameters generator 54 to obtain the above-noted outputs.

Figure 14A:
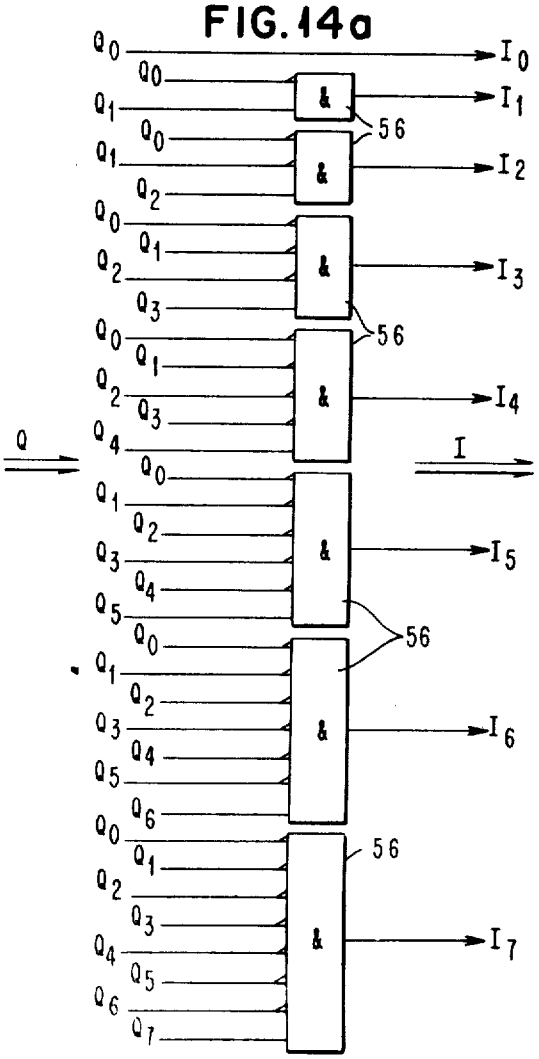
FIG. 14a is a schematic block diagram showing the details of the generation of the I indicators.

Referring to FIG. 14a, there is shown the logic network connections for generating the I pointers $I_0 \ldots I_7$ which identify the first erroneous data track called the $I^{th}$ track. Combinations of the pointer signals $Q_0 \ldots Q_7$ are utilized as inputs to AND circuits 56. The combinations are arranged in successively increasing order of one. For example, the grouping is $Q_0$ and $Q_0$, $Q_1$ followed by $Q_0$, $Q_1$, $Q_2$, etc. It should be observed that all of the inputs except the additional input in each of the combinations is inverted in a NOT circuit at the inputs to the respective AND circuits 56. It can be seen that as long as all the pointer inputs are zero, there will be no output from any of the AND circuits 56. However, the first nonzero pointer signal will be indicated by an output from its corresponding AND circuit 56. That is, the AND circuit 56 having that pointer as the additional pointer input.

Figure 14B:
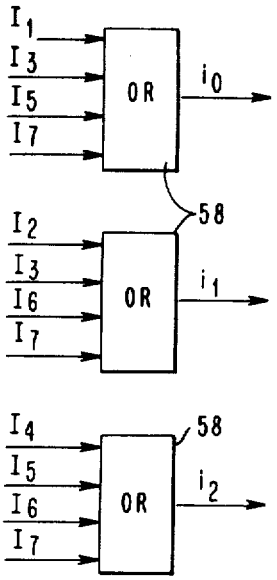
FIG. 14b is a schematic block diagram showing the i parameter as a binary number.

FIG. 14b has as input the I indicators generated in FIG. 14a. The circuit generates the i parameter as a b-bit binary number. The input combinations of the I indicators are determined according to columns in Table 2. The logic connections are determined in accordance with the 1's in the row in the columns of Table 2. For example, the column i(0) has a 1 in the 1, 3, 5, and 7 positions. Accordingly, the connections to the first OR circuit are the $I_1$, $I_3$, $I_5$, and $I_7$ indicator inputs. These combinations of inputs are fed to OR circuits 58, the outputs of which form a binary number. For example, the $i=5$ indicated by $I_5$ would have a 1 input to the first OR circuit 58 and a 1 input to the third OR circuit 58 giving an output of 101 which is the binary number 5.

Table 2

| | Parameter I as a Binary Number | | | |
|---|---|---|---|---|
| | | i as Binary Number | | |
| i | Indicated By: | i(2) | i(1) | i(0) |
| 0 | $I_0$ | 0 | 0 | 0 |
| 1 | $I_1$ | 0 | 0 | 1 |
| 2 | $I_2$ | 0 | 1 | 0 |
| 3 | $I_3$ | 0 | 1 | 1 |
| 4 | $I_4$ | 1 | 0 | 0 |
| 5 | $I_5$ | 1 | 0 | 1 |
| 6 | $I_6$ | 1 | 1 | 0 |
| 7 | $I_7$ | 1 | 1 | 1 |

Figure 14C:
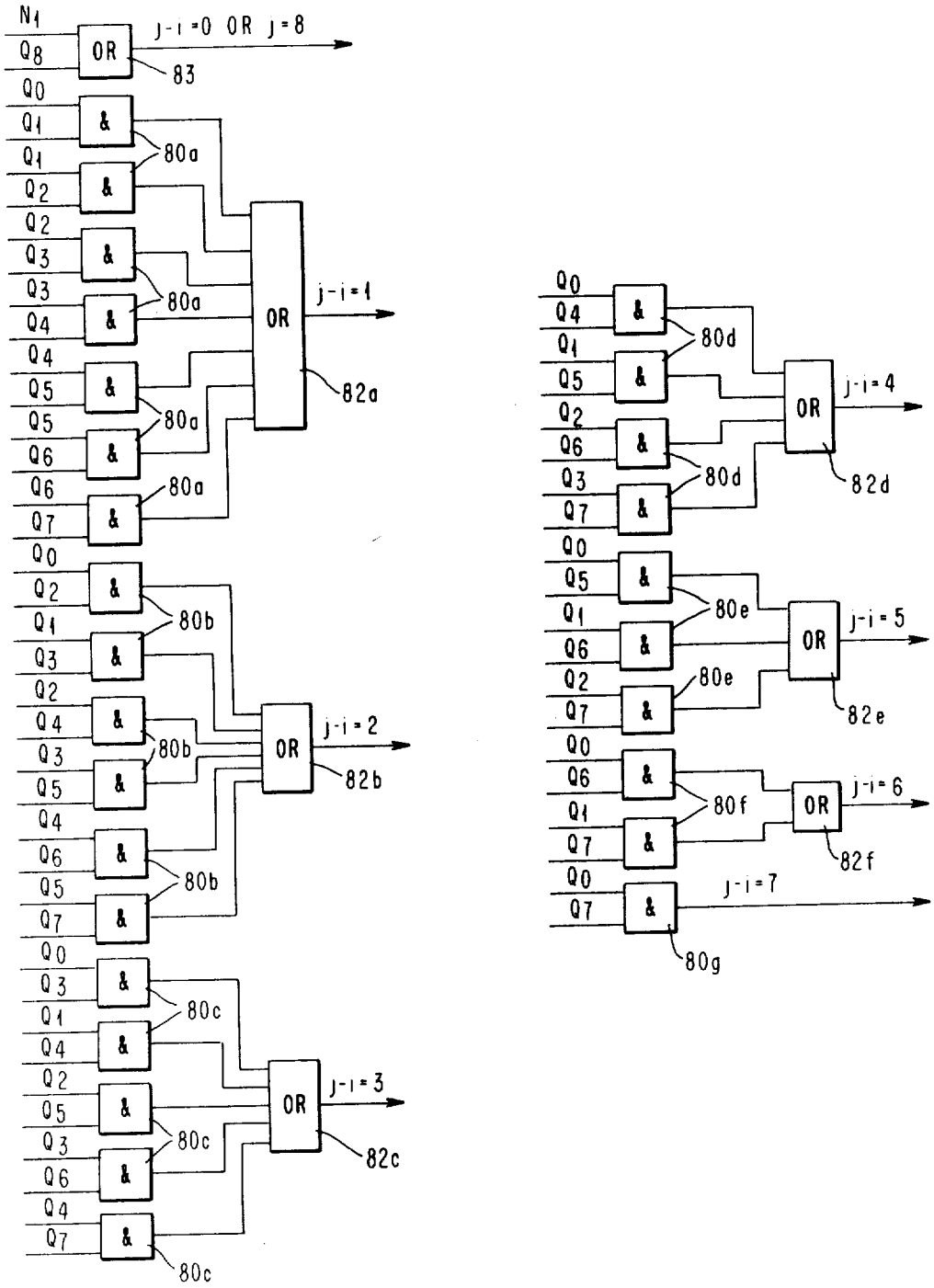
FIG. 14c is a schematic block diagram showing the generation of the j−i indicators.

FIG. 14c shows a logic circuit diagram which generates the $j-i$ values from the track pointers Q. This is accomplished by combining the Q pointers into pairs of inputs to separate AND circuits 80. The input paired arrangement of pointers has a first group of pairs separated by the value 1, while a second group of pairs is separated by the value 2. The third pair is separated by the value 3, the fourth pair by the value 4, etc. Each of these Q pointer pairs is fed to respective AND circuits 80 whose outputs form the input to appropriate OR circuits 82 to obtain the appropriate $j-i$ value. The $j-i=1$ value is obtained from the first OR circuit 82a which has as inputs thereto the outputs from the first group of and circuits 80a which have the input pairs separated by one. Similarly, the other OR circuits 82b–82f have connections thereto based on similar properties. For example, the second OR circuit 82 has an output value $j-i=2$; while the third OR circuit 82c has a value $j-i=3$, etc. A single input pair $N_1$ and $P_8$ is provided to a separate OR circuit 83 which produces the output value $j-i=0$ or $j=8$.

Figure 15A:
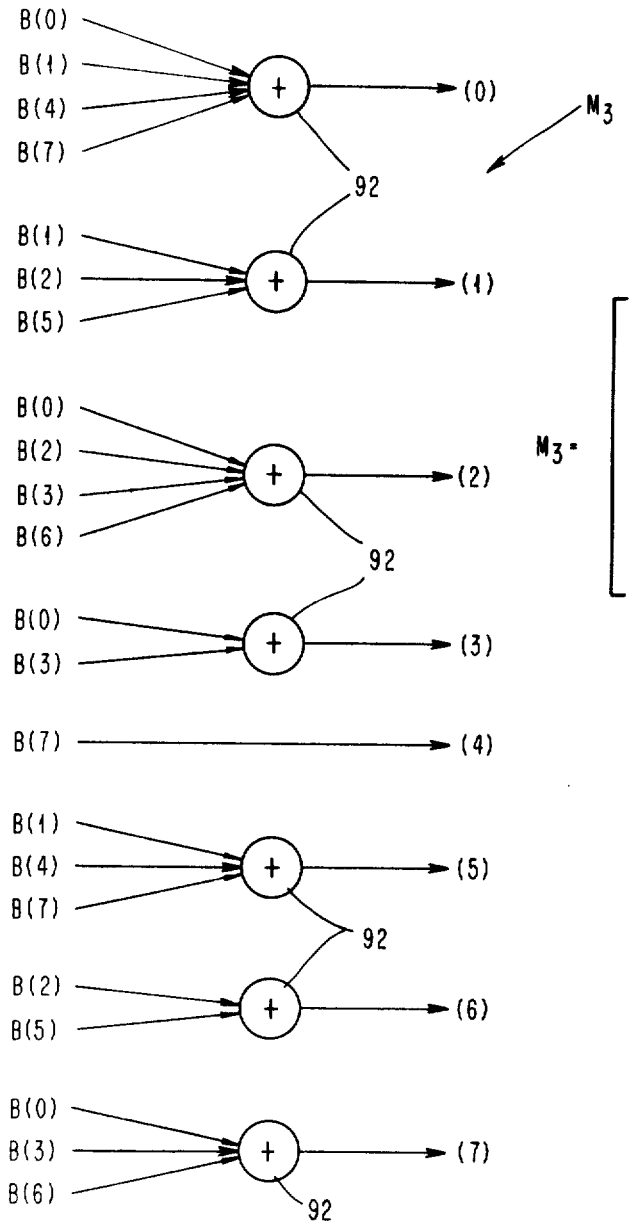
FIG. 15a is a schematic block diagram of the $M_3$ multiplier and the $M_3$ matrix indicating the connections of the multiplier.

FIG. 15 shows the error pattern generator 45 generating the second error in the two track erasure error and the $e_2$ and $S_2=0$ signals for the code pointer generator. The error pattern generator 45 has as one input $S_1$ and as another input $T^{-i}S_2$. Each of the bits of the vector inputs $S_1$ and $T^{-i}S_2$ are utilized as inputs to each of the eight two-way Exclusive-OR gates 85. The output of each of these eight Exclusive-OR gates 85 is inputted to networks of Exclusive-OR gates $M_1$ through $M_7$, there being no M network in the eight-branch circuit at the bottom of FIG. 15. The details of the network of Exclusive-OR gates M are shown in FIG. 15a with $M_3$ being utilized as the example. The circuit actually performs a multiplication function on the B vector input. The multiplier matrix is obtained by solving the term $M_{j-i}=-(I_s\ T^{j-i})^{-1}$. The output of the multiplier consists of the input multiplied by $M_{j-i}$. Each of the bits of the output byte from the multiplier M are inputted to a separate two-way AND gate 88. This means that each of the AND circuits 88 represented in FIG. 15 represent eight two-way AND gates. These gates have as another input the $j-i$ value associated with that AND gate. The output of the AND gates is fed to eight-way OR gates 90, the output from which forms the eight-digit vector representing the error $e_2$. The signal $S_2=0$ is generated from the signals $T^{-1}S_2$ by means of an OR gate 91.

FIG. 15a shows the details of the $M_3$ multipuer. The inputs to the modulo 2 adder circuits of t! . $M_3$ multiplier are determined in accordance with the $M_3$ matrix shown therein. The various matrices $M_1$ through $M_7$ corresponding to $g(x)=1+x^3+x^4+x^5+x^8$ are given as follows:

$$M_1=\begin{bmatrix}01111111\\00111111\\00011111\\11110000\\00000111\\11111100\\11111110\\11111111\end{bmatrix}\quad M_4=\begin{bmatrix}01011101\\10101110\\01010111\\01110110\\01100110\\11101110\\01110111\\10111011\end{bmatrix}\quad M_7=\begin{bmatrix}10011100\\01001110\\10100111\\11001111\\11111011\\11100001\\01110000\\00111000\end{bmatrix}$$

$$M_2=\begin{bmatrix}00101010\\00010101\\00001010\\10101111\\11111101\\01010100\\10101010\\01010101\end{bmatrix}\quad M_5=\begin{bmatrix}10001000\\11000100\\01100010\\00111001\\10010100\\01000010\\00100001\\00010000\end{bmatrix}$$

$$M_3=\begin{bmatrix}11001001\\01100100\\10110010\\10010000\\00000001\\01001001\\00100100\\10010010\end{bmatrix}\quad M_6=\begin{bmatrix}00111110\\10011111\\11001111\\01011001\\10010010\\11110111\\11111011\\01111101\end{bmatrix}$$

The connections of the various modulo 2 adder circuits 92 in the $M_3$ multiplier or any of the multipliers is given by the appropriate row of the associated matrix. For example, in the $M_3$ multiplier, the connections are made in accordance with the rows as follows: The $0^{th}$ row has a 1 in the 0, 1, 4, and 7 positions; thus the $0^{th}$ modulo 2 adder has a $B_0$, $B_1$, $B_4$, and $B_7$ input. The other modulo 2 adder circuits have inputs corresponding to the 1 digits in the corresponding rows of the matrix. Note that the $4^{th}$ row has a 1 in only the $7^{th}$ position and hence, is shown by a direct connection.

Figure 16:
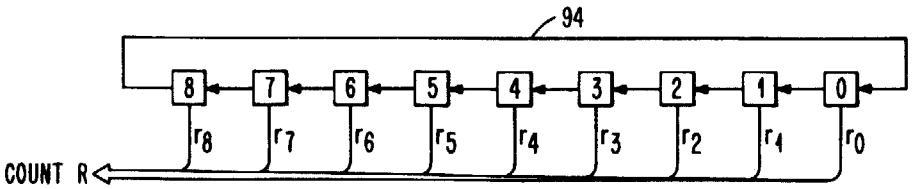
FIG. 16 is a schematic block diagram of the ring counter shown in block form in FIG. 10.
Figure 17:
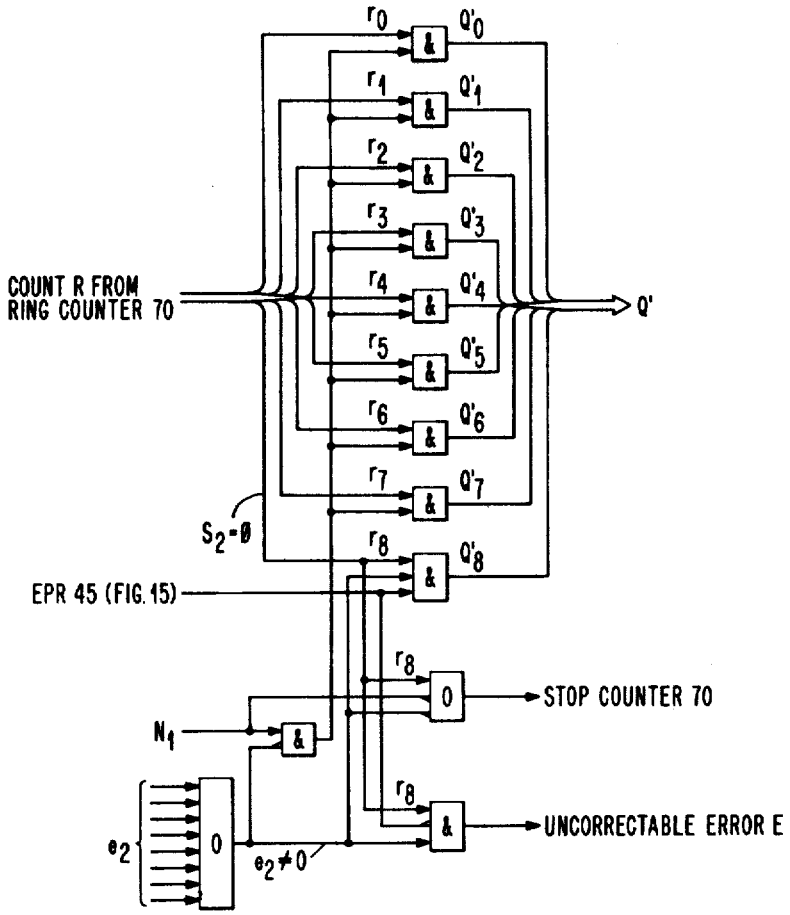
FIG. 17 is a schematic block diagram of the code pointer generator shown in block form in FIG. 10.

Referring to FIG. 16, there is shown the details of the ring counter circuit 70 as shown in block form in FIG. 10. The ring counter 70 is shown having 0–8 stages with a feedback 94 from the eighth to the 0 stage. The output from each successive stage going to the next numerically higher state. The output from each of these stages is the corresponding count output $r_0$ through $r_B$, which forms the count R as shown in FIG. 10. The output R is utilized as an input to the code pointer generator 72. The nine r pointers of the count R are inputted to nine separate AND gates 96 as can be seen in FIG. 17. As can be seen in FIG. 10, the other input to the code pointer generator 72 is $N_1$ from the N indicator 74 and $e_2$ and $S_2=0$ from the output of the error pattern generator 45. The $e_2$ input is fed to an OR circuit 98 in FIG. 17 which produces an output when $e_2\neq 0$. This output is fed to an AND circuit 99 along with $N_1$. The $e_2\neq 0$ input to the AND circuit is NOTed so that when $E_2=0$ and $N_1$ is present, the AND circuit 99 will produce a one output which is fed to the eight-AND gates 96 and along with the appropriate R bit inputs produces as 1 output indicative of the particular code pointer Q' which indicates the single track in error. It will be appreciated that if $e_2\neq 0$ at the output of the OR gate 98, a one will be produced which, through the NOT circuit, will be 0 at the AND gate 99; and, thus, the AND gate will produce no output. Therefore, the code pointers Q' will not be generated when $e_2\neq 0$, except $Q'_8$. For $Q'_8$, the $S_2=0$ signal and the $e_2\neq 0$ signal control the AND gate 96a indicating the $8^{th}$ track (parity track) is in error when $S_2=0$ and $e_2\neq 0$ are both 1. The eighth count from the R count is fed to an OR circuit 97 which has as the other two inputs the $N_1$ and $e_2\neq 0$ output of the OR circuit 98. Each of these latter two inputs are NOTed so that if $e_2=0$, we get a 1 input to the OR circuit 97. Also, if $N_1=0$, we get a 1 input to the OR circuit 97. The $r_8$ count will be an input to the OR circuit 97 also. Therefore, a 1 value of any of the value above three signals will produce the stop counter signal S. The eighth count $r_8$ and the $e_2\neq 0$ signals are input to the AND circuit 100. The output of this AND circuit 100 indicates that the error is uncorrectable when E has a 1 value.

Figure 18:
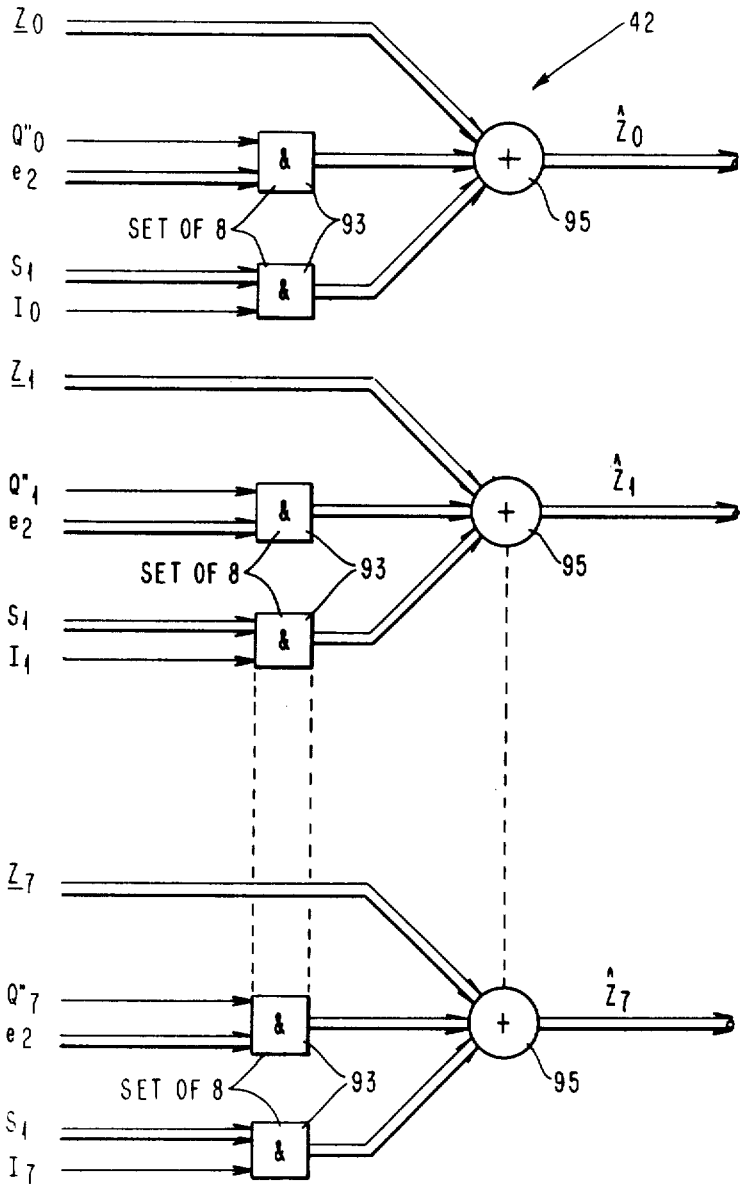
FIG. 18 is a schematic block diagram showing the error corrector block of FIG. 10 in more detail.

Referring to FIG. 18, there is shown the error corrector circuit 42 which produces the corrected data bytes $\hat{Z}_0, \hat{Z}_1, \ldots \hat{Z}_7$ by combining the read data bytes $Z_0$, $Z_1$, ... $Z_7$, the error pattern byte $e_2$, and the pointer signal $I_0$ through $I_7$ and $Q'_0$ through $Q'_7$. The combining is done in accordance with the equations:

$$\hat{Z}_i=Z_i\oplus S_1\oplus e_2$$

$$\hat{Z}_j=Z_j\oplus e_2$$

It can be seen from these equations as shown in FIG. 10 that $e_2$ is added modulo 2 to both the erroneous read bytes and $S_1$ is added to the first erroneous read byte. This is accomplished by a set of eight modulo 2 summing networks 95 and two sets of eight AND gates 93 for each data byte $Z_0$, $Z_1$, $Z_2$, ... $Z_7$ as shown in FIG. 18. The first set of eight AND gates 93 acts like a normally closed gate controlled by the corresponding track pointer signal $Q''_i$ and passes the $e_2$ byte only when the associated Q'' track pointer is on. The second set of nine AND gates 93 is controlled by the corresponding I signal and passes syndrome $S_1$ only when the 1 pointer is on. The set of nine modulo 2 summing networks 92 combine the input signals $Z_i$, $e_2$, and $S_1$ to produce the corrected byte $\hat{Z}_i$.

As aforestated, magnetic tapes are read in both forward and backward directions. The error correction methods and apparatus of the present invention accommodate such requirements. When reading in the so-called forward direction, the decoder may be operated in the same mode as the encoder or backward shifted to save time. When readng the so-called backward direction, a backward shift with $T^7$ premultiply, with an assymetrical polynomial symmetrically reversing feedback and input connections, etc. Also, all data signals in a signal set can be buffered with $S_1$ and $S_2$ being calculated on such buffered signals rather than serially.

Since the parity portion and orthogonally symmetrical portion are independent, in the event of catastrophic failures, two degraded modes of operation with correction are possible—one using parity only and a second using ORC only.

For a single track correction without the parity track, an independently generated track pointer is required. The described apparatus for two-track correction is employed while forcing $j=8$; the single track in error i will be corrected as described for two-track correction (using an independent pointer). Broadly, without the parity (or other code) inputs, the error correction capability is reduced and separate track identification is required; but the orthogonal symmetry still enables correction along a track based upon cross-track byte calculations.

The invention may also be practiced with nonbinary notation, i.e., ternary, decimal, hexadecimal, etc., with equal advantage. The parity vector P may be a Hamming code, Fire code, and the like, or even a residue based upon a different polynominal.

While the invention has been particularly shown and described with reference to a preferred embomdiment thereof, it will be understood by those skilled in the art that various changes in form and detail may be made therein without departing from the spirit and scope of the invention.

What is claimed is:

1. An error correcting system for correcting up to two channels in error in a multiparallel channel data handling system comprising:

an encoding system including cyclic check bit generating means for generating an orthogonally symmetrical check bit for each of said parallel channels, said check bits being entered into said respective channels and being grouped to form a cross-channel check byte;

said encoding system further including parity bit generating means for generating parity bits for information bytes formed in a cross-channel direction, means for entering said parity bits into one of said parallel channels;

means for decoding said data by means of said parity bits and information bytes formed in the cross-channel direction to detect errors; and means for correcting errors in all the bytes extending along any one or more channels including cyclic means generating a cyclic syndrome vector simultaneously to a parity syndrome vector based on the errors detected in the decoding utilizing only said cross-track bytes.

2. An error correcting system according to claim 1, wherein said parity bit generating means generates another parity bit for each of said groups of check bits forming a cross-channel byte so that said means for decoding is applicable to said cross-track check byte and said means for correcting errors includes the said check bits in any one or two designated channels of said parallel channels.

3. An error correcting system according to claim 1, wherein said means for generating check bits including means for computing said cross-track check bytes according to the relationship:

$$C = TB_1 \oplus T^2B_2 \oplus T^3B_3 \oplus \ldots \oplus T^{n2}B_{n2}$$

where T is the companion matrix of an irreducible binary polynominal g(x) of degree $n_2$ and $T^i$ represents the $i^{th}$ power of the matrix T and $B_i$ represents the $n_2$ data bytes of $n_1-1$ bits.

4. An error correcting system according to claim 3, wherein said means for generating check bits includes a shift register which premultiplies the incoming bytes by T.

5. An error correcting system according to claim 3, including means in said decoder for computing two syndrome bytes $S_1$ and $S_2$ each of $n_1-1$ bits according to the relationship:

$$S_1 = P \oplus \underline{P}$$

which is derived from modulo 2 addition of the generated parity byte P and the received parity byte $\underline{P}$; and $$S_2 = \underline{C} \oplus T^1\underline{B}_1 \oplus T^2\underline{B}_2 \oplus \ldots \oplus T^{n2}\underline{B}_{n2}$$

wherein an underlined symbol indicates a byte of said received message corresponding to nonunderlined symbols in said sent message.

6. An error correcting system according to claim 5, wherein said means for computing two syndrome bytes $S_1$ and $S_2$ includes feedback shift registers, said shift register for computing $S_2$ being a backward shifting register having a premultiplier $T^{n2}$.

7. An error correcting system according to claim 1, means supplying error location pointers, said means for decoding includes an N indicator means for providing the control signal $N_1$, $N_3$, and Q in response to error pointers indicating the channel in error, the $N_1$ signal indicates that only one channel pointer or none are on, the $N_3$ signal indicates that more than two channel pointers are on, and the Q output represents the pointers $Q_0$–$Q_8$, and means for inhibiting said control signals Q when $N_1$ or $N_3$ is on.

8. An error correcting system according to claim 7, wherein said means for decoding further includes means for generating the error track parameters I, i, and j−i from the pointer control signals Q, the error channel parameter I being a new pointer which identifies the first erroneous data channel called the $I^{th}$ channel, the signals i being generated as binary numbers from the I pointer signals and the j−i signals indicating the responsive distance of the channels in error.

9. An error correcting system according to claim 8, wherein said means for decoding includes means for generating the error pattern $e_2$ from the $S_1$ and $T^{-i}S_2$ inputs controlled by said j−i inputs according to the relationships:

$$e_2 = M_{j-i}[S_1 \oplus T^{-1}S_2]$$

where:

$$M_{j-i} = [I_d \oplus T^{j-i}]^{-1}$$

if $j-1 \neq 0$ and $j \neq 8$ $$M_{j-i} = I_d$$

if $j-i=0$ or $j=8$ and $I_d$ is an identity matrix.

10. An error correcting system according to claim 9, wherein said means for decoding includes means for generating a code pointer Q′ and means for generating a count R, said means for generating a code pointer having the count R, the control signal $N_1$, and $e_2$ as inputs; said code pointer generator generating the code pointer Q′ indicative of a single track in error when said input signal $e_2=0$ and $N_1$ is on, the R count from said ring counter indicating the channel in error.

11. An error correcting system according to claim 1, wherein said means for correcting errors in all the bytes extending along any one channel or any two designated channels includes modulo 2 adder circuits for comparing the error patterns $S_1$ and $e_2$ with said channel bytes of information $\underline{Z}_0$, $\underline{Z}_1$, $\underline{Z}_2$, . . . $\underline{Z}_7$ and producing corrected information in accordance with said error patterns to obtain the corrected information $\hat{Z}_0$, $\hat{Z}_1$, . . . $\hat{Z}_7$.

12. The method of transferring successive N-bit signal bytes through N channels, one signal from each byte in a channel, including the steps of:

A. at a transmitter, 1. collecting N-1 data signal bytes;
2. generating a check bit signal byte for said N-1 data signal bytes in an orthogonally symmetrical manner;
3. transferring said N-1 data and check bit signal bytes as a signal set over said N channels;

repeating (1), (2), and (3) until signals have been transferred; and

B. at a receiver for said transferred data signal bytes in each said set, 4. computing a second check bit signal byte supposedly identical to said transferred check bit signal byte;
5. comparing the check bit signal byte and from said comparison generating an error pattern for signals along a given channel;
6. indicating which channel is said given channel having signals in error; and
7. applying said error pattern to correct signals in said given channel for such signal set.

13. The method set forth in claim 12 further including the steps of:

A-1. at the transmitter, 8. generating an independent check bit signal for each of said bytes including said check bit signal byte as they are being transferred;

B-1. at the receiver, 9. combining said independent check bits for all of said bytes in a given signal set with said check bit signal byte for generating first and second error pattern signals respectively for first and second chanels;
10. repeating step (6) for each signal set for indicating which two channels have signals in error; and
11. selectively modifying step (7) to correct signals in two of said channels rather than correcting errors in but one channel for such signal set.

14. The method set forth in claim 12 further in said step (2) generating said check bit signal byte in accordance with an identity matrix and N-1 companion matrices, each matrix consisting of n column vector operator signals modulo a selected polynomial; and B-2. at said receiver, 12. processing said data bytes in each said channel such that the operational relationships between each and every data bit and each and every check bit with respect to said column vector operators remain the same even though the signals are along the respective channels.

15. The method set forth in claim 14 further including selecting said independent check bit signal to be a parity signal and selecting a magnetic tape unit having nine tracks with a central one of said tracks being the parity track and the other eight tracks, including the outside tracks, being data tracks, and repeatedly performing said steps (1) through (3), (8) for recording a plurality of successive end bit signal bytes on said tape and repeatedly performing steps (4) through (7) and (9) through (12) for reading back the signals recorded on such tape.

16. The method of operating a multichannel digital signal apparatus, including the steps of:

selecting a first group of said channels to sequentially transfer plural sets of data signals, the number of signals in each channel for each set being one less than the number of channels in said first group;

for each said set, generating a first check byte having one signal in each channel for said each set of said first group and arranging all signals in each said set including said check byte signals to have orthogonal symmetry; and generating second check signals based on said arranging and supplying said second check signals to a channel other than said first group of channels.

17. The method set forth in claim 16 selecting a polynomial from the Galois Field $2^b$ for said first check byte, where b is the number of channels in said first group and generating said second check signals in a manner not describable in terms of symbols in said Galois Field $2^b$.

18. The method set forth in claim 16 including generating said second check signals as parity signals based upon one signal from each of said channels in said first set and aligned in a cross-channel direction.

19. The method of operating a multichannel digital signal transfer system, including the step:

selecting first and second independent error correction codes, each having a given error correction capability, said first error correction code exhibiting orthogonal symmetry;

dividing the digital signals into sets along the respective channels into a number of signals less than the number of channels;

establishing a first check bit byte in accordance with a given orthogonal symmetry and a polynomial in said first error correction code;

establishing a second check bit byte in accordance with said second error correction code; and selectively using one or both of said codes to correct errors in a given one of said channels.

20. The method set forth in claim 19 including selectively using both of said codes to correct errors and including shifting data signals in the respective sets in a forward direction for processing signals in a so-called forward direction including premultiplying by a matrix T of said polynomial, then repeatedly matrix multiplying by a matrix T by shifting in a forward direction and including linear feedback in said shifting in accordance with said polynomial; and selectively processing said signals in a backward direction including premultiplying said signals in the respective sets by a matrix $T^7$ of said polynomial and including matrix multiplying said signals in such sets by $T^{-1}$ for seven times in a so-called backward direction.

21. The method set forth in claim 19 further including selecting said first independent error correction code to have orthogonal symmetry in accordance with a given polynomial and arranging column vectors based upon said polynomial in a predetermined manner such that said check bit signals mathematically established said check bit byte in a predetermined relationship to the data signals in a cross-channel direction, a first position being an end position of an array including said data signals and said first check bit byte signals.

22. The method set forth in claim 21 further including selecting said column vectors to generate error correction and error bit generating matrices for placing said check bit byte in a central position of said data signals array rather than in said end position.

23. The method of generating a check bit to establish orthogonal symmetry in a set of data and check signal bytes, each byte having N-1 bits and the set having N bytes, N being a positive integer greater than 1, including the following steps:

arranging the signals in a rectangular array;

selecting one of the diagonals of said rectangular array as a line of symmetry;

selecting a bit position of said check byte for a check bit signal to be generated;

generating the selected check bit signal by modulo 2 adding signals in the array along selected ones of diagonals transverse to said line of symmetry, the signals on said transverse diagonals being either on said line of symmetry or symmetrically disposed with respect to said line of symmetry and selecting one of said selected diagonals in accordance with the location of said selected check bit signals in said array and adding said signals symmetrically except for said check bit signal to be generated.

24. The method of claim 23 including generating the seleceted check bit signal by modulo 2 ending all signals along said selected transverse diagonals except said check bit signal in one of said selected diagonals.

25. The method of claim 23 further including the step of selecting said check bit position and then selecting all said transverse diagonals in a sequence proceeding from said one transverse diagonal in but one direction along said line of symmetry.

26. Error correcting apparatus for processing data and check bit signals received from a multichannel signal transfer system, said signals in said channels being grouped into multichannel signal sets having a number of signals along each channel equal to the number of channels, all signals in one channel being a first check bit redundancy portion and one signal of each set in each remaining channel being a signal in a second check bit redundancy portion, said data signals and second check bit redundancy signals exhibiting orthogonal symmetry, the improvement including in combination;

first byte signal processing means for calculating said first check bit redundancy based on received signals from said remaining channels and comparing same with received first check bit redundancy signals from said one channel to supply first syndrome signals;

second byte signal processing means for each signal set for simultaneously processing one signal from each of said remaining channels to compute said second check bit redundancy and compare a received second redundancy signal with calculated second check bit redundancy to supply second syndrome signals;

means storing received signals from said remaining channels;

means receiving said syndrome signals and having orthogonally symmetrical matrix multiplication means to generate an error pattern for signals in error along any one of said channels in one of said signal sets; and means receiving said stored signals and said error pattern for correcting signals in error, if any, along one or more of said channels.

27. The error correcting apparatus set forth in claim 26 including forward signal processing indicating means and backward signal processing indicating means;

means in said second byte signal processing means responsive to said forward processing indicating means to premultiply said data signals on a byte basis by a matrix T based upon a polynomial for said second check bit redundancy portion and effectively forward shifting said signals to multiply by said matrix T and including linear feedback means during said second byte signal processing;

means in said second byte signal processing means responive to said backward byte processing indicating means to premultiply said data signals by the matrix $T^7$ and further having means operating said second byte signal processing means for effectively shifting said signals in a backward direction such that each shift is equal to a matrix multiplication of $T^{-1}$; and all of the other means in said error correcting apparatus being responsive to said forward and backward indicating means, respectively, to alter operations to accommodate forward and backward signal processing.

28. The apparatus set forth in claim 27 further including means in said syndrome receiving means indicating when said one channel is in error and operation altering means responsive to indicating that said one channel is in error not to correct said one channel; and means generating an indication of which data channel is in error and said error correcting means being jointly responsive to said second byte signal processing means and said error pointer means to correct data signals in error independent of signals from said one channel.

29. The error correcting apparatus set forth in claim 26 wherein said second byte signal processing means generates a set of output signals equal to $T^{-i}S_2$;

error pattern generator means responsive to said $T^{-i}S_2$ and to said first byte signal processing means for generating a given error pattern;

counter means responsive to the number of bytes being processed to supply an R count;

code pointer generator means jointly responsive to said R count and said given error pattern to generate a track-in-error pointer signal;

error track parameter generator responsive to said code pointer generator and having error pointer means for generating a set of track-in error pointer signals and error correcting means jointly responsive to said given error pattern and to said track-in-error indicator to correct errors along a given channel wherein said given error pattern is used both to indicate a track in error and the error pattern along such track; and wherein said error correction means is further responsive to said first byte signal processing means to correct a second channel in error in accordance with pointer signals received from said error track parameters generator.

30. An error correction signal generating system for a multichannel digital transfer system, a first plurality of said channels transferring data representing digital signals, the improvement including in combination:

means grouping data representing digital signals along each channel in signal groups having a number of signals equal to a number less than said first plurality;

means associating all groups in said channel together as a multichannel signal set;

means calculating check bit redundancy signals for all signals in one signal set;

means for transmitting a first portion of said redundancy signals along a channel not in said first plurality of channels and means for transmitting a second portion of said redundancy signals as one signal in each of said first plurality of channels; and said calculating means establishing an orthogonal symmetry between said data signals and said second portion of said redundancy signals in each said signal set.

31. A signal transfer system having error detection and correction capabilities, including in combination:

a signal transfer apparatus having a given error mode;

data signal means connected to said apparatus for exchanging data signals therewith;

first means interposed between said apparatus and said data signal means for selecting a given number of said data signals and including means grouping said selected data signals into a plurality of channel bytes to form an error correcting signal set;

error signal means in said first means receiving said data signals as cross-channel signal bytes, such cross-channel bytes having one data signal from each said channel bytes in accordance with a rectangular array of signals having one more signal along one dimension of said array than another dimension, redundancy means in said error signal means generating a redundancy signal byte having a number of check bit signals equal to the number of signals along said one dimension and operating on said signals as a square signal array with said redundancy signal byte in said array being parallel to said another dimension, means in said redundancy means relating each of said check bit signals to a unique group of said data signals such that all related signals (each check bit signal and its associated unique group of said data signals) exhibit orthogonal symmetry about a predetermined diagonal of said square array; and means in said first means exchanging a redundancy signal byte between said error signal means and said apparatus.

32. The system set forth in claim 31 further including second error signal means in said first means for each signal set independently generating a separate second check bit signal on all signals in each said cross-channel bytes, plus a second check bit signal on said redundancy byte; and means exchanging all said second check bit signals between said signal transfer apparatus and said second error signal means.

33. The system set forth in claim 32 including error correction means receiving said data signals, said redundancy byte, and all said second check bit signals and for each said signal set for combining same to generate signals pointing to at least one of said bytes as being in error, if in error, and error pattern means selecting said redundancy byte exchanged with said signal transfer apparatus to indicate which bits of said byte in error are in error.

34. The method of arranging data signals and generating check redundancy signals in connection with transferring digital data signals, including the steps of:

dividing said digital data signals into successive signal sets, dividing each said signal set into a given plurality of channel bytes, the number of said digital data signals in each channel byte being one less than said given plurality;

generating a first check redundancy signal byte having a number of signals equal to said given plurality and based upon a given error correcting polynomial of the irreducible type;

generating a second check redundancy signal byte to have said given plurality of byte check bit signal portions, selecting signals from each said channel bytes and said first check redundacy signal byte to generate said check bit signal portions, respectively; and transferring said signal set and said first and second check redundancy signal bytes as a set of digital signals.

35. The method set forth in claim 34 further including the steps of:

taking transferred signals and generating new first and second check redundancy signal bytes therefrom; and combining transferred first and second check redundancy signal bytes with said new first and second check redundancy signal bytes to generate pointer signals pointing to bytes in error and error pattern signals pointing to individual transferred data signals in said bytes in error for enabling correction of said individual signals.

36. The method set forth in claim 35 further including the steps of evaluating signal transfer and pointing to bytes possibly being in error based upon such evaluation; and selectively modifying said combining of said check redundancy signal bytes in accordance with said error possibility pointing for correcting a greater number of signals than without such error pointing.

37. The method of preparing digital signals for recording such digital signals comprising the steps of:

selecting a set of digital signals to be recorded, dividing said set into a given number less one of channel bytes, each channel byte having said given number of digital signals;

generating a check byte of said given number of signals in an orthogonal symmetrical manner for each digital data signal set;

independently generating a second check byte having an independent portion for groups of signals having one signal from each said channel byte and one portion for said check byte; and recording all signals of one set including said check bytes as a separate record entity.

38. The method of reading correcting errors in digital signals read from a record member having recorded digital signals arranged in sets, each set having a predetermined number of digital data signals, a first redundancy signal subset exhibiting orthogonal symmetry with said digital signals in said set and a second redundancy signal subset in said set not exhibiting said orthogonal symmetry with said digital data signals but exhibiting a second error correcting characteristic, reading said signals from said record member, the method including the steps of:

generating new first and second redundancy signals from digital data signals read from said record member, such new redundancy signals matching recorded redundancy signals in an error-free condition;

comparing said new first and second redundancy signals with first and second redundancy signals read from said record member and generating an error location signal from said comparison showing that such error, if any, is in a given group of signals and error pattern signals showing which signals in such group are in error; and changing the signals in error.

39. The method of preparing digital data signals for recording in a block of such signals in a multitrack record member, the method improvement including the steps of:

1. selecting a set of data signals to be recorded with one signal in each channel for forming a cross-channel byte;
2. arranging said bytes into sets of one less than the number of channels of said cross-channel bytes;
3. generating a check cross-channel byte on said set of cross-channel bytes;
4. recording said cross-channel bytes of (2) and (3); and
5. repeating (1)–(4) until all signals to be recorded in a block have been recorded.

40. The method of claim 39 further including the steps of generating a parity signal for each cross-channel byte independent of said check cross-channel byte generating indicating parity on such check cross-channel byte and recording such parity signals in one channel.

41. The method of correcting signals in error in a set of digital data signals; including the steps of:

arranging the signals in a rectangular array of channel bytes along a first array dimension and cross-channel bytes along a second array dimension;

generating a check byte redundancy by successive byte calculations along one array dimension;

generating a first set of syndrome signals and error pattern signals from said redundancy and data signals along said one array dimension; and correcting errors by applying said error pattern signals to data signals in one byte extending along a second one array dimension.

42. The method set forth in claim 41 further including the steps of:

generating a second redundancy along said second one array dimension independently of said first redundancy but having a check portion based upon said first redundancy;

generating a second set of syndrome signals based upon said second redundancy and said data signals and said first redundancy, and a second set of error pattern signals; and simultaneously applying said error patterns to two bytes, respectively, extending along said second one array dimension.

43. The method set forth in claim 42 and practiced in part in a linear feedback shift apparatus, the method of arranging said signals into said array including loading said bytes along said one array dimension serially into said shift register while synchronously shifting same and feeding back in accordance with a selected irreducible polynomial;

storing said loaded bytes fed to said shift register in a storage apparatus; and applying said error pattern signals serially to selected two signals in each said loaded bytes while synchronously transferring such bytes from said storage apparatus.

44. A code circuit for a multichannel signal processing apparatus which processes a given number of signals from each channel as a group of signals, a check character set of signals being included in said group of signals and having one signal in each said channels, a multichannel network realizing polynomial g(x) and receiving said given signals in seriatim from said apparatus, one signal at a time from each channel in parallel with one signal from others of said channels after generating a syndrome character representative of errors in said given signals;

first means indicating a single channel in error, means responsive to said indication for applying said syndrome character to said channel in error as an error pattern for correcting said given signals in said channel in error.

45. The circuit set forth in claim 44 further including a parity channel in said apparatus having a given number of parity signals associated with said group of signals, the improvement further including in combination:

second means in said first means indicating two channels in error and means inhibiting said first means indications when two channels in error are indicated, and means receiving said parity signals and said given signals to generate a parity syndrome character, means responsive to said second means to apply said syndrome characters as error patterns to respective ones of said two channels in error for correcting signals in said channels in error.

46. Code circuits for multichannel signal apparatus, including in combination:

a check character generator circuit means realizing polynomial g(x) and generating a check character based upon received signals from all channels and means supplying said check character with one signal in each of said channels, first circuit means supplying successive sets of signals in parallel to said generator circuit, second circuit means responsive to a given number of said successive sets of signals being supplied to activate transfer of said check character as a check set of signals interleaved among said sets, control means for repeatedly activating said circuit means to generate a train of signal sets in all channels including interleaved check sets, and receiver means responsive to said check sets and associated ones of said sets of signals to correct signals in any one of said channels.

*47. Apparatus for identifying and correcting errors in one or two tracks of digital information derived from a multi-track medium, bits of data from ones of the tracks forming a byte, said tracks including a parity track, said bytes including n data bytes $D_1$–$D_n$ and an error checking code ECC byte of i bits, said error checking code ECC being related to said data bytes according to the relation*

$$ECC = \begin{bmatrix} n = 7 \\ m = 1 \\ \Sigma\, D_n X^m \\ n = 1 \\ m = 7 \end{bmatrix} [X^0 + X^3 + X^4 + X^5 + X^8]$$

*comprising:*

*logic means for operating sequentially upon each of n received data bytes and an ECC byte to produce an error term E, said error term being equal to zero in the absence of errors in the received data and ECC bytes;*

*second logic means for regressively operating upon said error term $-i$ times to produce the vector $EC^{-i}$;*

*means for accepting signals representative of data bits of the digital information and responsive thereto for deriving a parity character $P_n$ which in combination with a data byte $D_n$ produces an even number of data bits of a first kind;*

*combining means for logically combining a regressed error vector and a parity vector $P_n$ on a bit-by-bit basis to form the expression $EB^{-i}+P_n$;*

*a data correction matrix;*

*parity correction logic means coupled to said logic means and to said means for accepting for receiving an error vector and a parity vector and operative to apply a signal to said data correction matrix to correct the ith data track to conform with said parity vector when said regressed error vector equals said parity vector;*

*means for receiving track pointers indicating the presence of errors in ones of said tracks and for disabling the correction apparatus when three or more tracks are in error;*

*track separation logic means coupled to said means for receiving and responsive to track pointers for identifying the separation (i–j) between a most significant track i which is associated with a lower-order polynomial term and a least significant track j which is associated with a higher-order polynomial term of the polynomial*

$$\sum_{n=1}^{n=7} D_n X^m \quad m=7$$

*a divisor generator coupled to said track separation logic for selecting the term $1+B^{-(i-j)}$ in accordance with track separation (i–j);*

*dividend logic means for dividing said regressively operated vector by the output of said divisor generator to produce an error vector $e_{nj}$ for data in the least significant track j in error;*

*logic means for combining on a bit-by-bit basis said derived parity character $P_n$ and said error vector $e_{nj}$ to produce an error vector $e_{ni}$ for data in the least significant track i in error;*

*means for associating said error vectors $e_{ni}$ and $e_{nj}$ with the data track and j respectively; and*

*said data correction matrix receiving uncorrected data and said error vectors and combining said data and said vectors to invert the polarity of erroneous bits of said uncorrected data in accordance with the characteristics of said error vectors.*

*48. The invention defined in claim 47, further including:*

*means for receiving a pointer indicative of an error in a received parity track P; and*

*means for correcting said parity track to correspond to said error vector $e_{ni}$.*

*49. Apparatus for identifying and correcting errors in one or two tracks of digital information derived from an encoded medium, said tracks including a parity track, each track being encoded with bits, each bit being associated with another bit from each track to form a byte, said bytes comprising data bytes $D_1$–$D_n$ and an error checking byte ECC, said error checking byte being related to said data bytes according to the relation*

$$ECC = \left[\sum_{n=1}^{m=7} D_n X^m\right] [X^0 + X^3 + X^4 + X^5 + X^6]$$

*comprising:*

*first logic means for operating sequentially upon each of n received data bytes and the error checking byte according to an operator B to produce an error term E, said operator B being such as to produce the error checking byte by sequentially operating upon data bytes $D_1$–$D_n$ said error term being equal to zero in the absence of errors in the received data and error checking bytes;*

*second logic means for regressively operating i times upon said error term according to the operator B to sequentially produce error vectors $e_{n1}$ through $e_{ni}$;*

*means responsive to bits encoded on the parity track of the digital information for generating parity vectors $P_n$ which when combined with a received byte and associated parity term produce an even number of data bits of a first kind;*

*means for sequentially combining ones of said error vectors with ones of said parity vectors;*

*separation logic means for receiving track pointers indicating the existence of errors in two identifiable tracks and producing output signals in response thereto;*

*track separation logic means coupled to said separation logic means and responsive to said output signals for identifying the separation between the most significant and least significant tracks in error;*

*divisor generator means coupled to said track separation logic means for outputting a divisor expression;*

*means for dividing ones of the combined error vector $e_{ni}$ and parity vector by said divisor expression to produce an error vector for data in the least significant track in error;*

*means for additively combining said least significant track error vector and said parity vector to produce an error vector for data in the most significant track in error; and*

*a matrix for associating each of said error vectors with appropriate ones of said tracks in error and for correcting erroneous data bits in said tracks in accordance with said error vectors.*

*50. Apparatus as set forth in claim 49, further including sequence inversion means coupled to said first logic means for inverting the order in which tracks of data bits are received by said first logic means.*

*51. Apparatus as defined in claim 50, further including means for rendering said identifying and correcting apparatus inoperative when track pointers indicating errors in three or more tracks are present.*

*52. Apparatus as defined in claim 51, further including means for receiving a pointer indicative of an error in a received parity track; and*

*means for correcting said parity track in conformity with the error vector for said most significant track in error.*

*53. Apparatus as defined in claim 52, wherein said matrix for associating includes a first plurality of inputs, further including:*

*means for sequentially applying bytes of uncorrected received data to said first plurality of inputs;*

*said matrix for associating comprising a data correction matrix including said first plurality of inputs and further having a second plurality of inputs, one input for each data track;*

*a most significant track correction vector matrix having a plurality of outputs coupled to said second plurality of inputs, and having inputs coupled to said means for additively combining and to said means for identifying said most significant track in error, for combining an error vector signal and a track identification signal and outputting a correction signal upon one of said outputs coincidentally with the transfer of a byte having an erroneous data bit in the most significant track in error to said data correction matrix; and*

*a least significant track correction vector matrix having a plurality of outputs coupled to said second plurality of inputs, and having inputs coupled to said means for dividing and to said separation logic, for combining an error vector signal and a track identification signal and outputting a correction signal upon one of said outputs coincidentally with the transfer of a byte having an erroneous data bit in the least significant track in error to said data correction matrix.*

*54. The method of identifying and correcting errors in one or two tracks of digital information derived from an encoded medium, said tracks including a parity track, each track being encoded with bits, each bit being associated with another bit from each track to form a byte, said bytes including n data bytes and an error checking code byte, comprising:*

*operating $n+1$ times upon n sequentially received data bytes and an error checking code byte in accordance with the operator B, said operator B being that operator used to develop the ECC byte in the encoded data, to produce an error term E;*

*generating a local parity signal to provide an even number of data bits of a first kind for each received data and error checking code byte including a received parity bit;*

*regressively operating upon error term E with the operator B a number of times i to sequentially produce error vectors $e_{n1}$–$e_{ni}$;*

*combining each sequentially produced error vector with ones of said parity vectors;*

*detecting a coincidence between an error vector and a parity vector; and*

*correcting the track of received data whose position corresponds to the number of regressive operations needed to achieve correspondence between said error and parity vectors, in accordance with the error vector so achieved.*

*55. The method defined in claim 54, further including the steps of*

*detecting the occurrence of $n+1$ regressive operations in which no coincidence between an error vector and a parity vector has occurred;*

*detecting the presence of two tracks of received data in which errors may have occurred and identifying the tracks;*

*dividing the combined error vector $e_{ni}$ for the most significant track in error and the associated parity vector by a term which is a function of the separation of the two tracks in error to produce an error vector $e_{nj}$ for the least significant of said tracks;*

*associating the least significant track error vector $e_{nj}$ with the least significant track in error;*

*associating the most significant track error vector $e_{ni}$ with the most significant track in error; and*

*correcting the erroneous tracks in accordance with said error vectors.*

*56. The method defined in claim 55, wherein i represents the position of the most significant track in error and j represents the position of the least significant track in error wherein the term by which combined error and parity vectors are divided is*

$$1+B^{(-i-j)}.$$

*57. The methd defined in claim 56, further including the step of detecting the presence of three or more tracks in error and preventing the correction of any of said tracks.*

*58. The method defined in claim 57, wherein said error vectors each comprise at least n bits, which bits are sequentially compared with corresponding bits in a given track of received data.*

* * * * *